(12) United States Patent
Jin et al.

(10) Patent No.: US 11,870,504 B2
(45) Date of Patent: *Jan. 9, 2024

(54) TRANSLATION DEVICE, TEST SYSTEM INCLUDING THE SAME, AND MEMORY SYSTEM INCLUDING THE TRANSLATION DEVICE

(71) Applicant: SAMSUNG ELECTRONICS CO., LTD., Suwon-si (KR)

(72) Inventors: Hyungmin Jin, Seoul (KR);
Younghoon Son, Yongin-si (KR);
Hyunyoon Cho, Uiwang-si (KR);
Youngdon Choi, Seoul (KR);
Junghwan Choi, Busan (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/096,657

(22) Filed: Jan. 13, 2023

(65) Prior Publication Data
US 2023/0171007 A1  Jun. 1, 2023

Related U.S. Application Data

(63) Continuation of application No. 17/366,329, filed on Jul. 2, 2021, now Pat. No. 11,581,960.

(30) Foreign Application Priority Data

Dec. 15, 2020  (KR) ........................ 10-2020-0175831

(51) Int. Cl.
*H04B 17/19* (2015.01)
*H04B 17/18* (2015.01)
*H04B 17/00* (2015.01)
*H04L 7/00* (2006.01)

(52) U.S. Cl.
CPC ......... *H04B 17/19* (2015.01); *H04B 17/0085* (2013.01); *H04B 17/18* (2015.01); *H04L 7/0016* (2013.01)

(58) Field of Classification Search
CPC .... H04B 17/19; H04B 17/18; H04B 17/0085; H04L 7/0016
See application file for complete search history.

(56) References Cited

U.S. PATENT DOCUMENTS

| 8,947,281 | B1 | 2/2015 | Azarmnia et al. |
| 9,135,185 | B2 | 9/2015 | Loh et al. |
| 9,699,009 | B1 | 7/2017 | Ainspan et al. |

(Continued)

OTHER PUBLICATIONS

Communication dated Feb. 7, 2022, issued by the European Patent Office in counterpart European Application No. 21190531.0.

*Primary Examiner* — Junpeng Chen
(74) *Attorney, Agent, or Firm* — Sughrue Mion, PLLC

(57) ABSTRACT

A translation device, a test system, and a memory system are provided. The translation device includes plural first input/output (I/O) circuits that respectively transmit and receive first signals through plural pins based on a pulse amplitude modulation (PAM)-M mode, a second I/O circuit that transmits and receives a second signal through one or more pins based on a PAM-N mode, and a translation circuit that translates the first signals into the second signal and translates the second signal into the first signals. M and N are different integers of 2 or more.

18 Claims, 35 Drawing Sheets

(56) References Cited

U.S. PATENT DOCUMENTS

| | | |
|---|---|---|
| 9,900,103 B1 * | 2/2018 | Lee .................... H04Q 11/0066 |
| 10,069,663 B1 | 9/2018 | Poon et al. |
| 10,164,817 B2 | 12/2018 | Hollis et al. |
| 10,404,505 B1 | 9/2019 | Wilson |
| 10,700,918 B2 | 6/2020 | Hollis et al. |
| 10,734,081 B1 | 8/2020 | Blatt et al. |
| 2014/0016404 A1 | 1/2014 | Kim et al. |
| 2016/0149730 A1 | 5/2016 | Navid |
| 2017/0302431 A1 | 10/2017 | Lugthart et al. |
| 2019/0280775 A1 * | 9/2019 | Gao .................... H04B 10/5167 |
| 2020/0084072 A1 | 3/2020 | Masuda et al. |
| 2020/0185049 A1 | 6/2020 | Spirkl et al. |
| 2020/0210361 A1 | 7/2020 | Keeth et al. |

\* cited by examiner

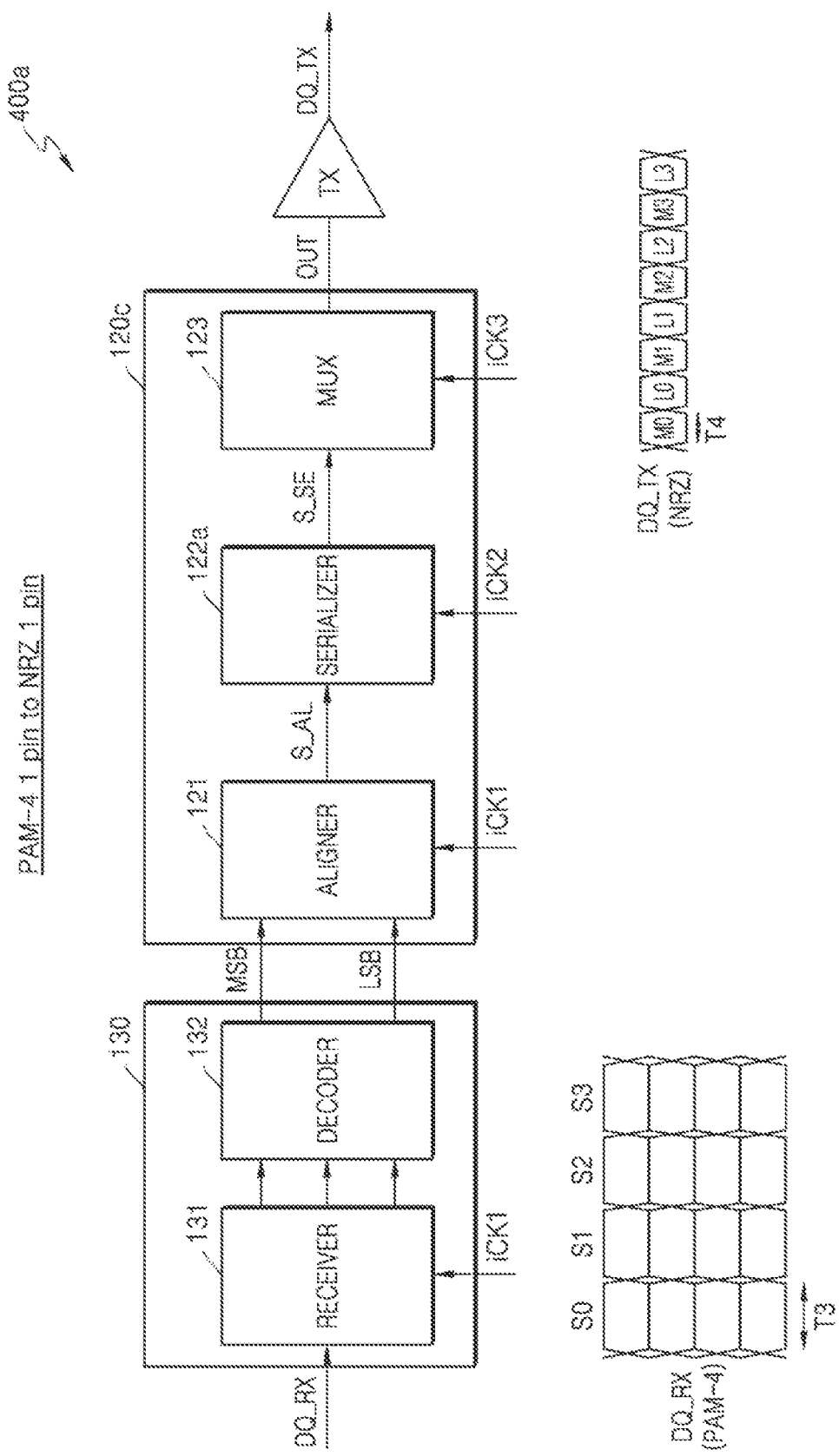

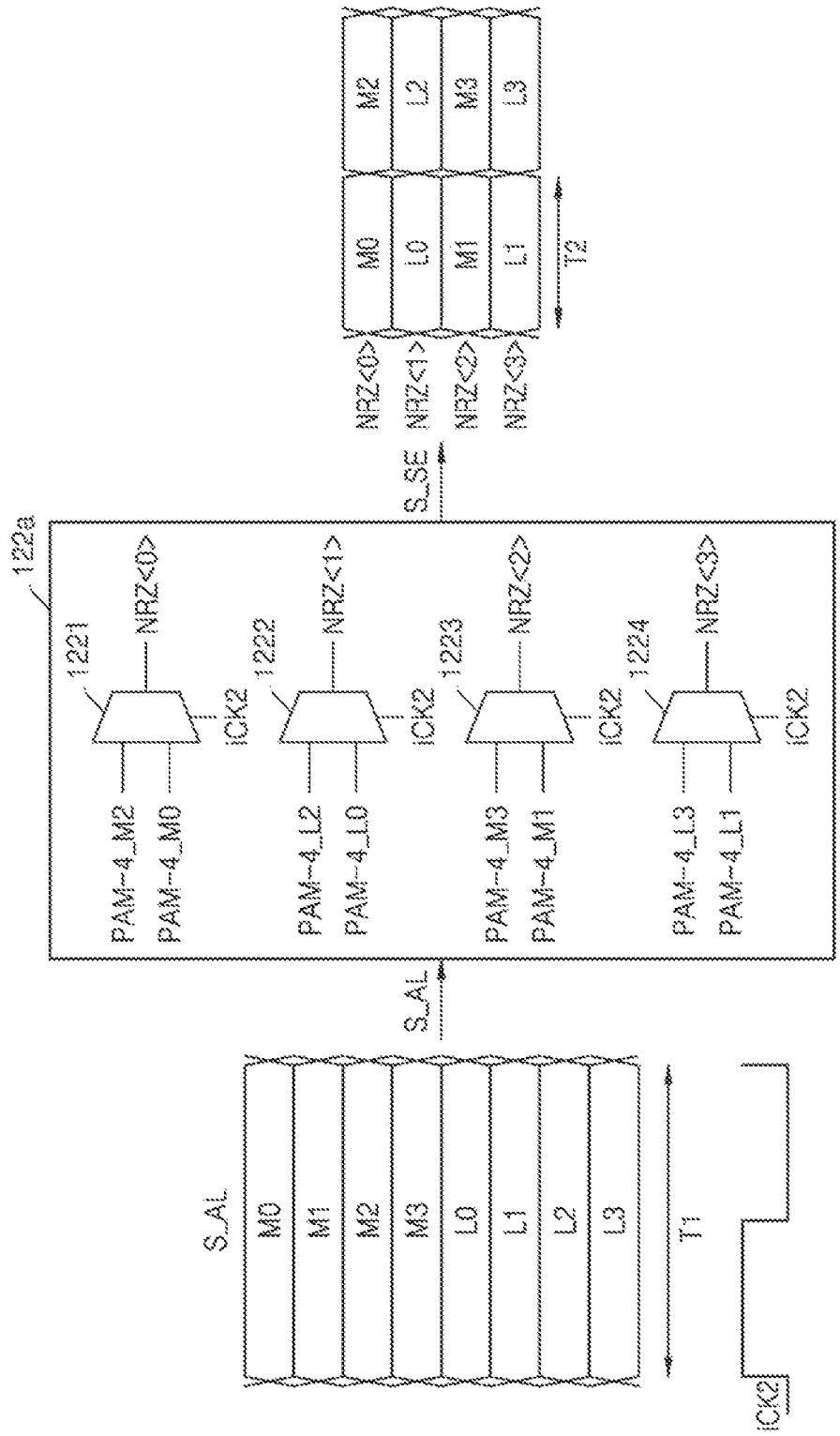

TRANSLATION DEVICE, TEST SYSTEM INCLUDING THE SAME, AND MEMORY SYSTEM INCLUDING THE TRANSLATION DEVICE

CROSS-REFERENCE TO RELATED APPLICATION

This application is a continuation application of U.S. application Ser. No. 17/366,329, filed on Jul. 2, 2021, which is based on and claims priority under 35 U.S.C. § 119 to Korean Patent Application No. 10-2020-0175831, filed on Dec. 15, 2020, in the Korean Intellectual Property Office, the disclosures of each of which being incorporated by reference herein in their entireties.

BACKGROUND

1. Field

The present disclosure relates to a memory device, and more particularly, to a translation device for translating a signal type, a test system including the translation device, and a memory system including the translation device.

2. Description of Related Art

As a capacity of data transmitted and received between devices increases and a need for high-rate data transfer increases, various signal modulation modes have been proposed. In the various signal modulation modes, a pulse amplitude modulation (PAM)-N mode may transmit one symbol during a unit interval. For example, according to a PAM-2 mode, one bit may be transmitted during a unit interval, and the PAM-2 mode may be referred to as a non-return to zero (NRZ) mode. For example, according to a PAM-4 mode, two bits may be transmitted during a unit interval. As described above, it may be difficult to transmit and receive a signal between devices respectively transmitting and receiving input/output signals modulated based on different signal modulation modes, and thus, a translation device for translating different signal modes is needed.

SUMMARY

According to an aspect of one or more embodiments, there is provided a translation device comprising a plurality of first input/output (I/O) circuits configured to respectively transmit and receive first signals through a plurality of pins based on a pulse amplitude modulation (PAM)-M mode; at least one second I/O circuit configured to transmit and receive a second signal through at least one pin based on a PAM-N mode; and a translation circuit configured to translate the first signals into the second signal and to translate the second signal into the first signals, wherein M and N are different integers of 2 or more.

According to another aspect of one or more embodiments, there is provided a translation device comprising a first input/output (I/O) circuit configured to transmit and receive a first signal based on a pulse amplitude modulation (PAM)-M mode; a second I/O circuit configured to transmit and receive a second signal based on a PAM-N mode; a translation circuit configured to translate the first signal into the second signal and to translate the second signal into the first signal; a first termination circuit disposed between a first I/O pin and the first I/O circuit and configured to provide a first termination resistance; and a second termination circuit disposed between a second I/O pin and the second I/O circuit and configured to provide a second termination resistance, wherein M and N are different integers of 2 or more.

According to another aspect of one or more embodiments, there is provided a test system comprising an automatic test equipment (ATE) including a first pin and a second pin; a device under test (DUT) including a third pin; and a built out test (BOT) module configured to be connected to the ATE and the DUT. The BOT module comprises a plurality of first input/output (I/O) circuits connected to the first pin and the second pin, respectively, and configured to transmit and receive first signals based on a pulse amplitude modulation (PAM)-M mode; a second I/O circuit connected to the third pin and configured to transmit and receive a second signal based on a PAM-N mode; and a translation circuit configured to translate the first signals into the second signal and configured to translate the second signal into the first signals, and M and N are different integers of 2 or more.

According to another aspect of one or more embodiments, there is provided a memory system comprising a first memory chip including a first pin and a second pin; a second memory chip including a third pin; and a translation device configured to be connected between the first memory chip and the second memory chip. The translation device comprises a plurality of first input/output (I/O) circuits connected to the first pin and the second pin and configured to transmit and receive first signals based on a pulse amplitude modulation (PAM)-M mode; a second I/O circuit connected to the third pin and configured to transmit and receive a second signal based on a PAM-N mode; and a translation circuit configured to translate the first signals into the second signal and configured to translate the second signal into the first signals, and M and N are different integers of 2 or more.

BRIEF DESCRIPTION OF THE DRAWINGS

Various embodiments will be more clearly understood from the following detailed description taken in conjunction with the accompanying drawings in which:

FIG. 21 is a block diagram illustrating in detail a BOT module according to an embodiment;

FIG. 22 is a block diagram illustrating a serializer according to an embodiment;

DETAILED DESCRIPTION

Hereinafter, various embodiments will be described in detail with reference to the accompanying drawings.

Figure 1:
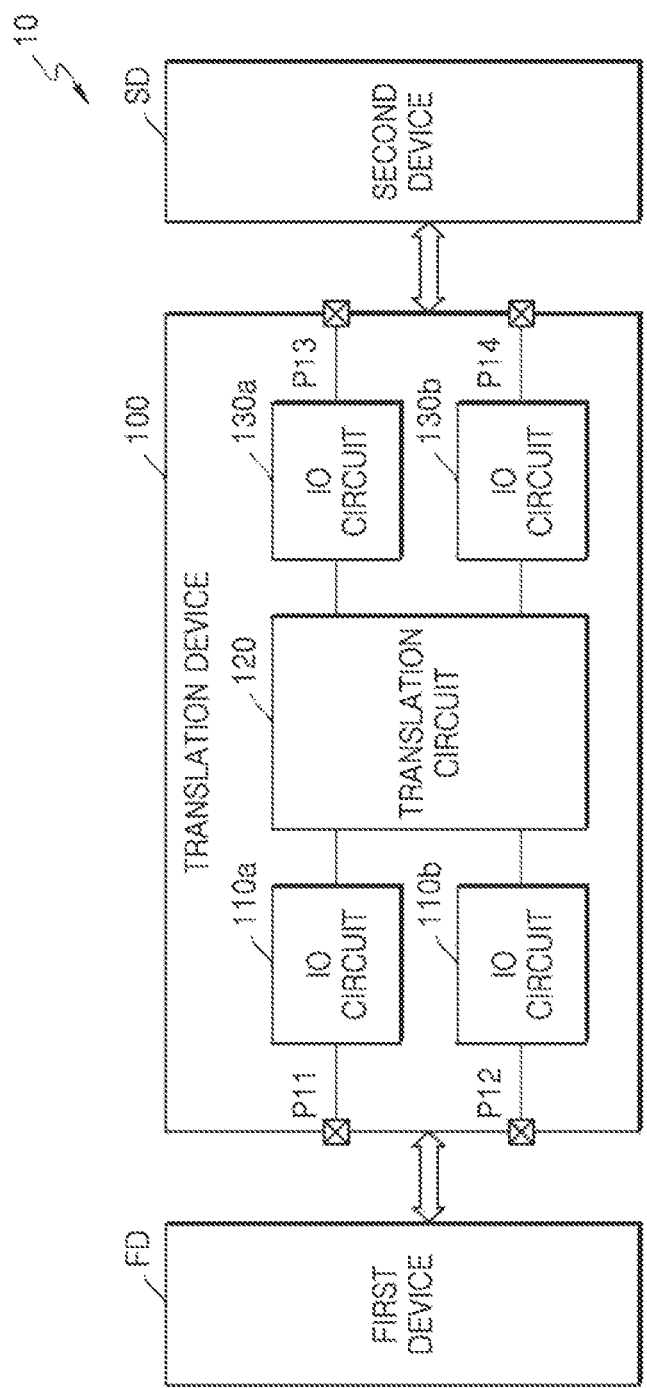
FIG. 1 is a block diagram illustrating a system according to an embodiment.

FIG. 1 is a block diagram illustrating a system 10 according to an embodiment.

Referring to FIG. 1, the system 10 may include a translation device 100, a first device FD, and a second device SD. The first device FD may transmit or receive a first signal type (i.e., a first signal modulated according to a first signal modulation mode), and the second device SD may transmit or receive a second signal type (i.e., a second signal modulated according to a second signal modulation mode). The translation device 100 may be disposed between the first device FD and the second device SD, may translate the first signal into the second signal, and may translate the second signal into the first signal.

The translation device 100 may include a plurality of first input/output (I/O) circuits 110a and 110b, a translation circuit 120, and a plurality of second I/O circuits 130a and 130b. Also, the translation device 100 may include a plurality of I/O pins (for example, a first pin P11 and a second pin P12) connectable to the first device FD, and the first I/O circuits 110a and 110b may be respectively connected to the first and second pins P11 and P12. Based on an I/O signal type of the first device FD, at least one of the first I/O circuits 110a and 110b may be activated. Also, the translation device 100 may include a plurality of I/O pins (for example, a third pin P13 and a fourth pin P14) connectable to the second device SD, and the second I/O circuits 130a and 130b may be respectively connected to the third and fourth pins P13 and P14. Based on an I/O signal type of the second device SD, at least one of the second I/O circuits 130a and 130b may be activated.

Figure 2:
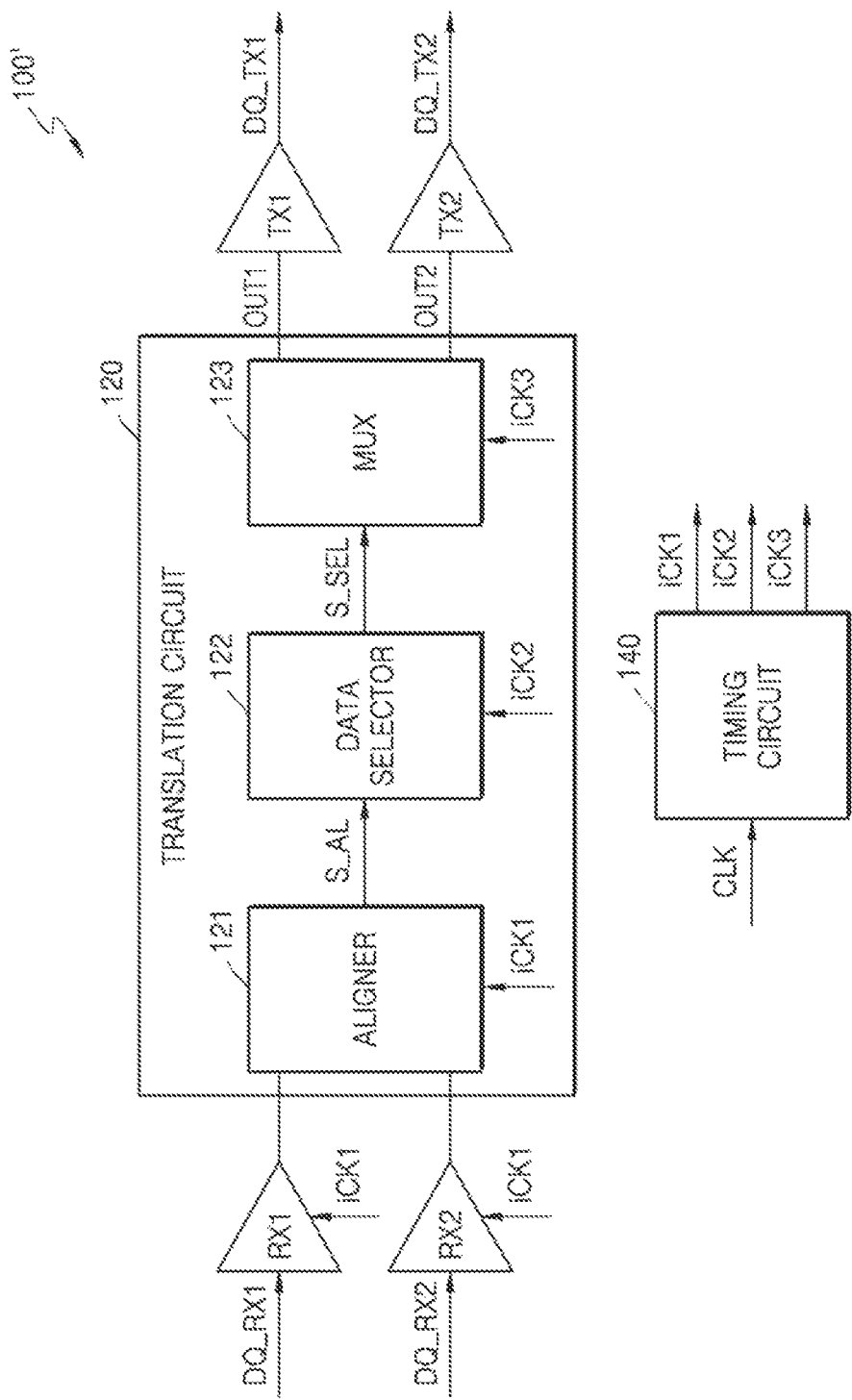
FIG. 2 is a block diagram illustrating a translation device according to an embodiment.

FIG. 2 is a block diagram illustrating a translation device 100' according to an embodiment.

Referring to FIG. 2, the translation device 100' may include a first receiver RX1 and a second receiver RX2, a translation circuit 120, a first transmitter TX1 and a second transmitter TX2, and a timing circuit 140. The translation device 100' may correspond to an implementation example of the translation device 100 of FIG. 1. The timing circuit 140 may generate a plurality of internal clock signals (for example, a first internal clock signal iCK1, a second internal clock signal iCK2, and a third internal clock signal iCK3) from an external clock signal CLK. For example, the timing circuit 140 may include a plurality of dividers, and thus, frequencies of the first, second, and third internal clock signals iCK1, iCK2, and iCK3 may differ. However, embodiments are not limited thereto, and at least two of the frequencies of the first, second, and third internal clock signals iCK1, iCK2, and iCK3 may be the same.

The first and second receivers RX1 and RX2 may respectively receive a first data input signal DQ_RX1 and a second data input signal DQ_RX2 and may respectively sample the first and second data input signals DQ_RX1 and DQ_RX2 on the basis of the first internal clock signal iCK1. In some embodiments, a data input signal may be received through one pin (for example, the first pin P11), and in this situation, only the first receiver RX1 may be activated. In some embodiments, data input signals may be received through two pins (for example, the first pin P11 and the second pin P12), and in this situation, both of the first and second receivers RX1 and RX2 may be activated. Each of the first and second receivers RX1 and RX2 may include a plurality of sense amplifiers (for example, sense amplifiers 131a to 131c of FIG. 7) and a decoder (for example, decoder 132 of FIG. 7), and a detailed configuration and operation thereof will be described below with reference to FIGS. 7 and 8.

The translation circuit 120 may include an aligner 121, a data selector 122, and a multiplexer (MUX) 123. The aligner 121 may align a signal received from at least one of the first and second receivers RX1 and RX2 on the basis of the first internal clock signal iCK1, thereby generating an aligned signal S_AL. The data selector 122 may receive the aligned signal S_AL from the aligner 121 and may generate a selected signal S_SEL from the aligned signal S_AL on the basis of the second internal clock signal iCK2. For example, the data selector 122 may include a serializer and a deserializer. The multiplexer 123 may receive the selected signal S_SEL from the data selector 122 and may multiplex the selected signal S_SEL on the basis of the third internal clock signal iCK3 to generate a first data output OUT1 and a second data output OUT2.

The first and second transmitters TX1 and TX2 may respectively generate a first data output signal DQ_TX1 and a second data output signal DQ_TX2 from the first and second data outputs OUT1 and OUT2. In some embodiments, a data output signal may be transmitted through one pin (for example, the third pin P31), and in this situation, only the first transmitter TX1 may be activated. In some embodiments, data output signals may be received through two pins (for example, the third pin P31 and the fourth pin P32), and in this situation, both of the first and second transmitters TX1 and TX2 may be activated. For example, each of the first and second transmitters TX1 and TX2 may include a first driver and a second driver (for example, drivers DRV1 and DRV2 of FIG. 13), and a detailed configuration and operation thereof will be described below with reference to FIG. 13.

Figure 3:
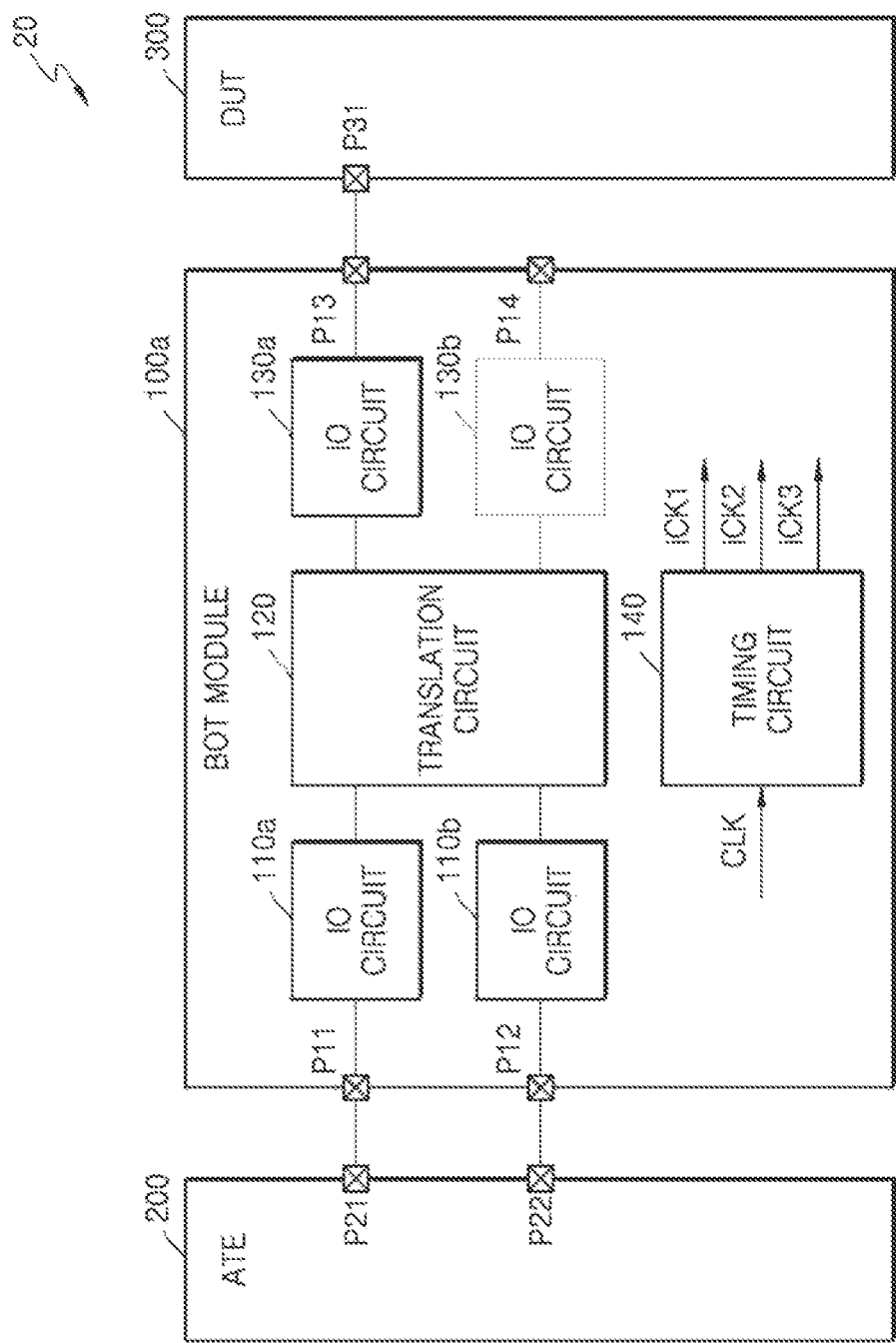
FIG. 3 is a block diagram illustrating a test system according to an embodiment.

FIG. 3 is a block diagram illustrating a test system 20 according to an embodiment, Referring to FIG. 3, the test system 20 may include a built out test (or built off test) (BOT) module 100a, automatic test equipment (ATE) 200, and a device under test (DUT) 300. The BOT module 100a may include a plurality of first I/O circuits 110a and 110b, a translation circuit 120, a plurality of second I/O circuits 130a and 130b, and a timing circuit 140. The BOT module 100a may correspond to an example of each of the translation device 100 of FIG. 1 and the translation device 100' of FIG. 2, and descriptions given above with reference to FIGS. 1 and 2 may be applied to the BOT module 100a and therefore repeated description is omitted for conciseness. The ATE 200 may correspond to an example of the first device FD of FIG. 1, the DUT 300 may correspond to an example of the second device SD of FIG. 1, and descriptions given above with reference to FIG. 1 may be applied to these components and a repeated description thereof is omitted for conciseness.

For example, the ATE 200 may include a first pin P21 and a second pin P22, and the first and second pins P21 and P22 may be respectively and electrically connected to first and second pins P11 and P12 of the BOT module 100a. The ATE 200 and the BOT module 100a may transmit or receive I/O signals through two pins. For example, the DUT 300 may include a first pin P31, and the first pin P31 may be electrically connected to a third pin P13 of the BOT module 100a. The DUT 300 and the BOT module 100a may transmit or receive an I/O signal through one pin. For example, an electrical signal may not be applied to a fourth pin P14, and the I/O circuit 130b may not be activated.

In some embodiments, the BOT module 100a may perform signal translation between multi-pins and a single pin. In detail, the BOT module 100a may translate a data input signal received from the third pin P13 to generate data output signals which are to be provided to the first and second pins P11 and P12. This translation will be described below with reference to FIGS. 5 to 10. Also, the BOT module 100a may translate data input signals received from the first and second pins P11 and P12 to generate a data output signal which is to be provided to the third pin P13. This translation will be described below with reference to FIGS. 11 to 15.

Figure 4A:
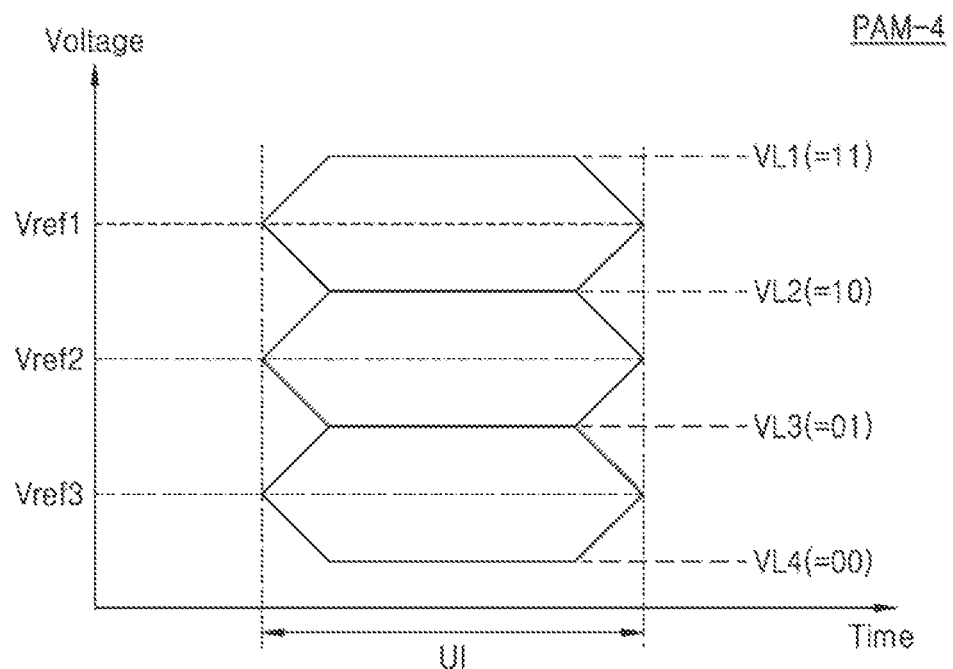
FIG. 4A is a graph exemplarily showing data for describing a pulse amplitude modulation (PAM)-4 mode among modulation modes for a data input/output signal, according to an embodiment.
Figure 4B:
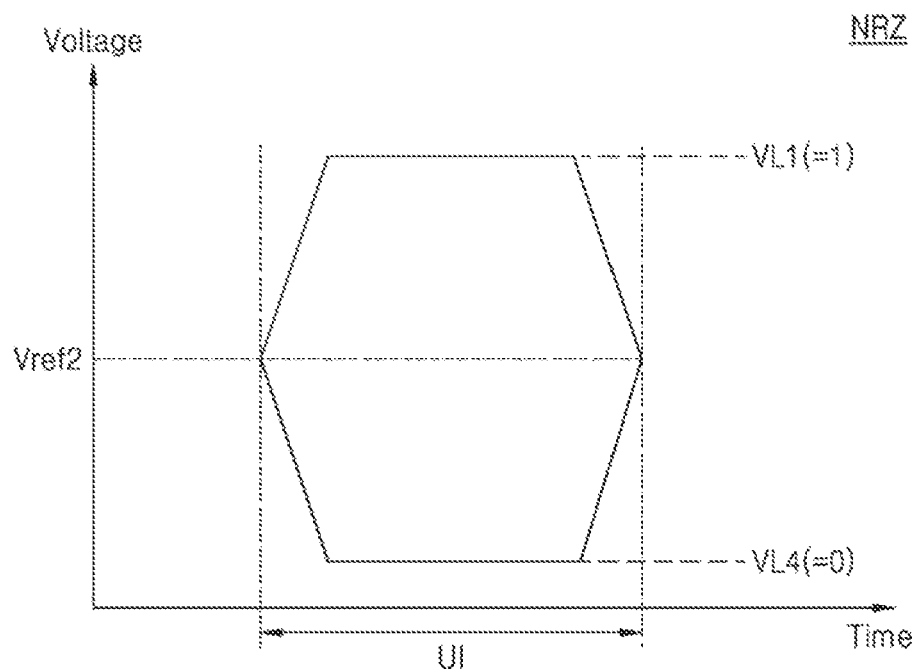
FIG. 4B is a graph exemplarily showing data for describing a non-return to zero (NRZ) mode among modulation modes for a data input/output signal, according to an embodiment.

FIG. 4A is a graph exemplarily showing data for describing a pulse amplitude modulation (PAM)-4 mode among modulation modes for a data input/output signal, according to an embodiment. FIG. 4B is a graph exemplarily showing data for describing a non-return to zero (NRZ) mode among modulation modes for a data input/output signal, according to an embodiment. In the graphs of FIGS. 4A and 4B, an abscissa axis may represent a time, and an ordinate axis may represent a voltage level.

Referring to FIG. 4A in conjunction with FIG. 3, a data I/O signal may be transmitted between the DUT 300 and the BOT module 100a on the basis of the PAM-4 mode. In this case, the data I/O signal may be generated to have one of a first voltage level LV1, a second voltage level VL2, a third voltage level VL3, or a fourth voltage level VL4. Therefore, two bits (for example, one of '11', '10', '01', and '00') may be transmitted through a data I/O signal between the DUT 300 and the BOT module 100a during a unit interval UI. For example, bits '11' may correspond to the first voltage level VL1, bits '10' may correspond to the second voltage level VL2, bits '01' may correspond to the third voltage level VL3, and bits '00' may correspond to the fourth voltage level VL4. That is, a symbol having one of the first to fourth voltage levels VL1 to VL4 may be generated during the unit interval UI, and each of symbols may correspond to two bits.

A data I/O signal transmitted based on the PAM-4 mode may be sampled based on a first reference voltage Vref1, a second reference voltage Vref2, or a third reference voltage Vref3. For example, when a voltage level of the data I/O signal is higher than the first reference voltage Vref1, the data I/O signal may be decoded as bits '11'. When a voltage level of the data I/O signal is lower than the first reference voltage Vref1 and higher than the second reference voltage Vref2, the data I/O signal may be decoded as bits '10'. When a voltage level of the data I/O signal is lower than the second reference voltage Vref2 and higher than the third reference voltage Vref3, the data I/O signal may be decoded as bits '01'. When a voltage level of the data I/O signal is lower than the third reference voltage Vref3, the data I/O signal may be decoded as bits '00'. For example, in a case where the DUT 300 transmits a data input signal to the BOT module 100a on the basis of the PAM-4 mode, the second I/O circuit 130a may compare a voltage level of the data input signal with each of the first to third reference voltages Vref1 to Vref3 on the basis of the PAM-4 mode to obtain two bits corresponding to the data input signal.

Referring to FIG. 4B in conjunction with FIG. 3, a data I/O signal may be transmitted between the ATE 200 and the BOT module 100a on the basis of the NRZ mode (i.e., a PAM-2 mode). In this case, the data I/O signal may be generated to have one of a first voltage level VL1 and a fourth voltage level VL4. In some embodiments, the first voltage level VL1 based on the NRZ mode may correspond to the first voltage level VL1 based on the PAM-4 mode, and the fourth voltage level VL4 based on the NRZ mode may correspond to the fourth voltage level VL4 based on the PAM-4 mode. Therefore, one bit (for example, one of '1' and '0') may be transmitted through a data I/O signal between the DUT 300 and the BOT module 100a during a unit interval UI. For example, a bit '1' may correspond to the first voltage level VL1, and a bit '0' may correspond to the fourth voltage level VL4. That is, a symbol having one of the first and fourth voltage levels VL1 and VL4 may be generated during the unit interval UI, and each of symbols may correspond to one bit.

A data I/O signal transmitted based on the NRZ mode may be sampled based on the second reference voltage Vref2. In some embodiments, the second reference voltage Vref2 based on the NRZ mode may correspond to the second reference voltage Vref2 of FIG. 4A. For example, when a voltage level of a data I/O signal DQ is higher than the second reference voltage Vref2, the data I/O signal DQ may be decoded as a bit '1'. When a voltage level of the data I/O signal DQ is lower than the second reference voltage Vref2, the data I/O signal DQ may be decoded as a bit '0'. For example, in a case where the ATE 200 transmits a data input signal to the BOT module 100a on the basis of the NRZ mode, the first I/O circuit 110a may compare a voltage level of the data input signal with the second reference voltage Vref2 on the basis of the NRZ mode to obtain one bit corresponding to the data input signal.

In FIG. 4B, it is illustrated that a reference voltage for sampling a data I/O signal in the NRZ mode is the second reference voltage Vref2, but embodiments are not limited thereto. For example, various voltages (for example, the first reference voltage Vref1 or the third reference voltage Vref3 of FIG. 4A) may be used as a reference voltage for sampling a data I/O signal in the NRZ mode.

In FIGS. 4A and 4B, for convenience of description, the PAM-4 mode and the NRZ mode have been described, but embodiments are not limited thereto. In some embodiments, in a case where a data I/O signal is transmitted between the ATE 200 and the BOT module 100a on the basis of a PAM-M mode, the data I/O signal may be generated to have one of first to $M^{th}$ voltage levels. Here, M may be a positive integer of 2 or more. In this case, a data I/O signal transmitted based on the PAM-M mode may be sampled based on first to $(M-1)^{th}$ reference voltages. For example, M may be 8, and a data I/O signal may be transmitted between the ATE 200 and the BOT module 100a on the basis of a PAM-8 mode. In this case, three bits may be transmitted through a data I/O signal between the ATE 200 and the BOT module 100a during a unit interval UI.

In some embodiments, in a case where a data I/O signal is transmitted between the DUT 300 and the BOT module 100a on the basis of a PAM-N mode, the data I/O signal may be generated to have one of first to $N^{th}$ voltage levels. Here, N may be a positive integer of 2 or more, which differs from M. In this case, a data I/O signal transmitted based on the PAM-N mode may be sampled based on first to $(N-1)^{th}$ reference voltages. For example, N may be 16, and a data I/O signal may be transmitted between the DUT 300 and the BOT module 100a on the basis of a PAM-16 mode. In this case, four bits may be transmitted between the DUT 300 and the BOT module 100a during a unit interval UI.

Figure 5:
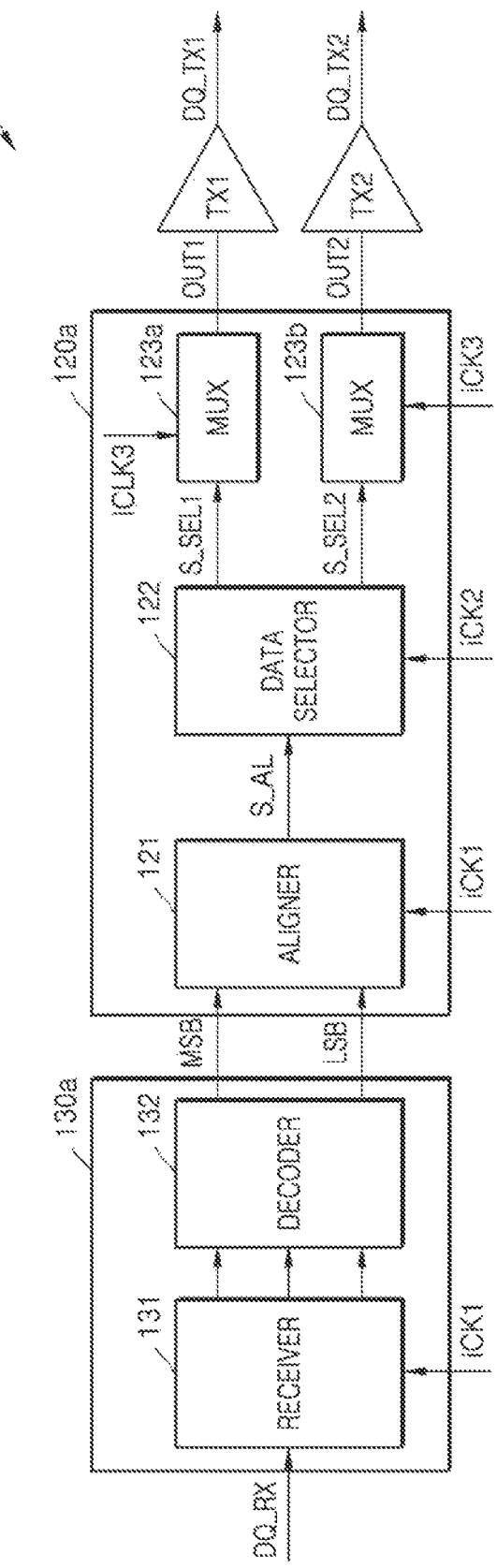
FIG. 5 is a block diagram illustrating in detail a built out test (BOT) module according to an embodiment.

FIG. 5 is a block diagram illustrating in detail a BOT module 100a according to an embodiment.

Referring to FIG. 5 in conjunction with FIG. 3, for example, the BOT module 100a may receive a data input signal DQ_RX through a third pin P13 and may output first and second data output signals DQ_TX1 and DQ_TX2 through first and second pins P11 and P12. The second I/O circuit 130a may include a receiver 131 and a decoder 132. The receiver 131 may sample the data input signal DQ_RX on the basis of a first internal clock signal iCK1, and the decoder 132 may decode a sampled data input signal to generate a most significant bit MSB and a least significant bit LSB.

A translation circuit 120a may include an aligner 121, a data selector 122, and a first multiplexer (MUX) 123a and a second multiplexer (MUX) 123b. The aligner 121 may generate an aligned signal S_AL from the most significant bit MSB and the least significant bit LSB on the basis of the first internal clock signal iCK1. The data selector 122 may generate a first selected signal S_SEL1 and a second selected signal S_SEL2 from the aligned signal S_AL on the basis of a second internal clock signal iCK2. The first and second multiplexers 123a and 123b may respectively generate a first data output OUT1 and a second data output OUT2 from the first and second selected signals S_SEL1 and S_SEL2.

A first transmitter TX1 and a second transmitter TX2 may respectively generate the first and second data output signals DQ_TX1 and DQ_TX2 from the first and second data outputs OUT1 and OUT2. For example, the first I/O circuits 110a and 110b may include the first and second transmitters TX1 and TX2, respectively.

Figure 6:
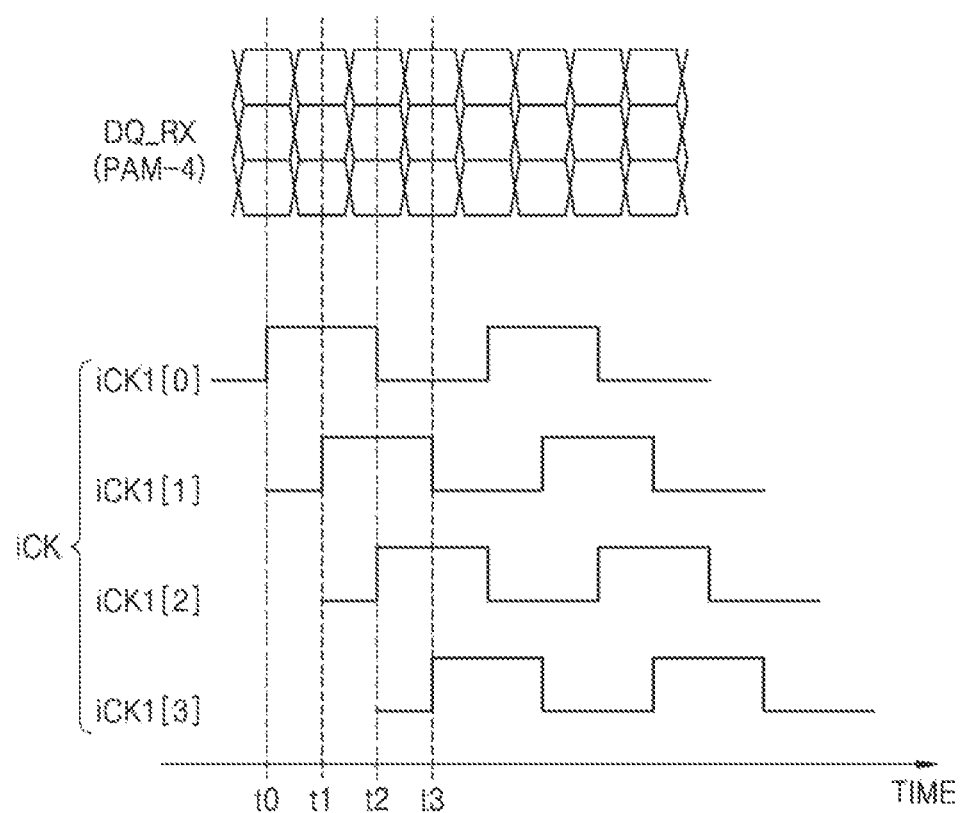
FIG. 6 is a graph for describing an operation of a receiver receiving a data input signal modulated based on the PAM-4 mode, according to an embodiment.

FIG. 6 is a graph for describing an operation of a receiver 131 receiving a data input signal DQ_RX modulated based on the PAM-4 mode, according to an embodiment.

Referring to FIG. 6 in conjunction with FIG. 5, a first internal clock signal iCK1 may include a plurality of first internal clock signals iCK1[0] to iCK1[3] having different phases. The receiver 131 may sample a data input signal DQ_RX at a first time t0 on the basis of the first internal clock signals iCK1[0] having a first phase, sample the data input signal DQ_RX at a second time t1 on the basis of the first internal clock signals iCK1[1] having a second phase, sample the data input signal DQ_RX at a third time t2 on the basis of the first internal clock signals iCK1[2] having a third phase, and sample the data input signal DQ_RX at a fourth time t3 on the basis of the first internal clock signals iCK1[3] having a fourth phase. For example, a frequency of an external clock signal CLK may be a first frequency f (for example, 2.5 GHz), and a frequency of the first internal clock signal iCK1 may be a second frequency f/4 (for example, 0.625 GHz) which is generated by dividing the first frequency f by 4.

Figure 7:
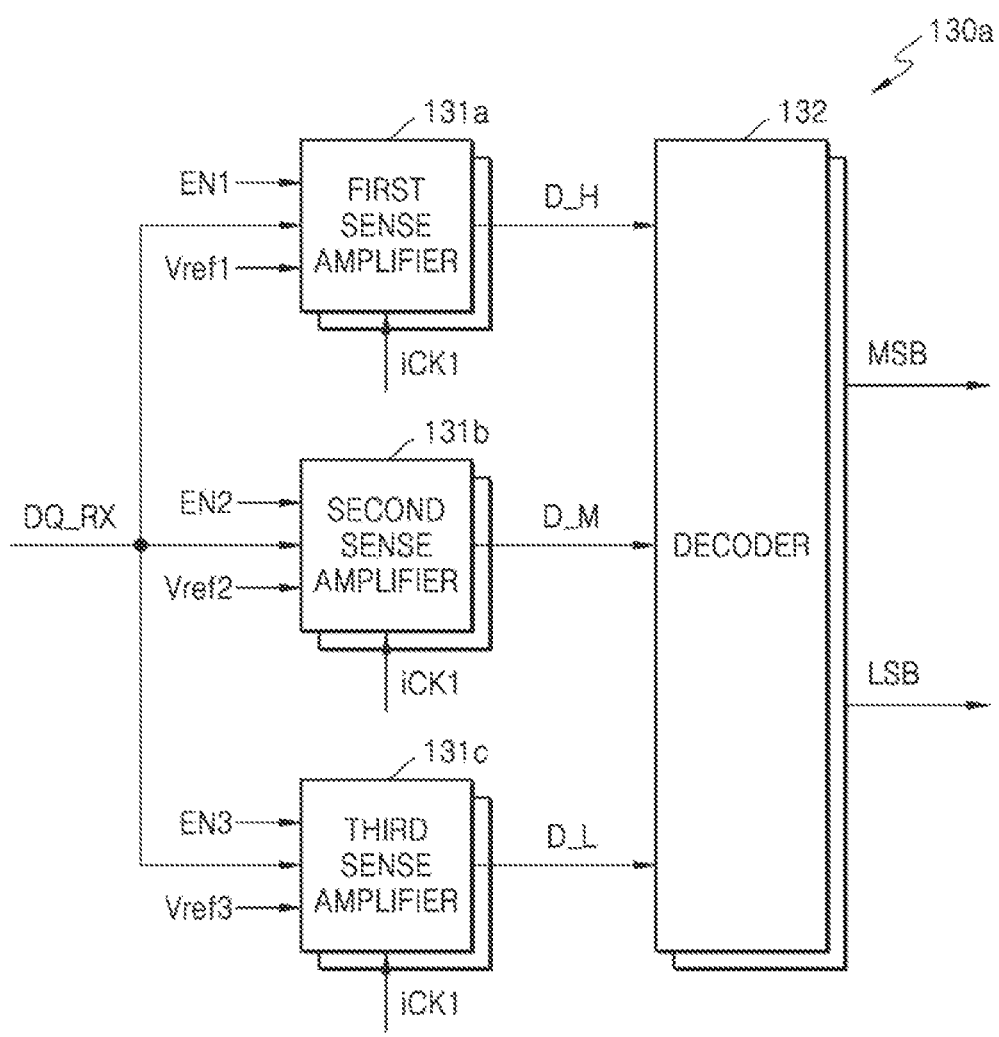
FIG. 7 is a block diagram illustrating an input/output (I/O) circuit according to an embodiment.

FIG. 7 is a block diagram illustrating a second I/O circuit 130a according to an embodiment.

Referring to FIG. 7, the second I/O circuit 130a may include a first sense amplifier 131a, a second sense amplifier 131b, and a third sense amplifier 131c and a decoder 132. The first to third sense amplifiers 131a to 131c may be included in the receiver 131 of FIG. 5. Each of the first to third sense amplifiers 131a to 131c may receive a data input signal DQ_RX and may operate based on a first internal clock signal iCK1.

The first sense amplifier 131a may compare a voltage level of the data input signal DQ_RX with a first reference voltage Vref1 to output a first comparison result D_H. The second sense amplifier 131b may compare the voltage level of the data input signal DQ_RX with a second reference voltage Vref2 to output a second comparison result D_M. The third sense amplifier 131c may compare the voltage level of the data input signal DQ_RX with a third reference voltage Vref3 to output a third comparison result D_L. For example, when the voltage level of the data input signal DQ_RX is higher than the first reference voltage Vref1, the first sense amplifier 131a may output '1' as the first comparison result D_H. When the voltage level of the data input signal DQ_RX is lower than the first reference voltage Vref1, the first sense amplifier 131a may output '0' as the first comparison result D_H.

The first to third sense amplifiers 131a to 131c may respectively output the first to third comparison results D_H, D_M, and D_L on the basis of a first comparison enable signal EN1, a second comparison enable signal EN2, and a third comparison enable signal EN3. For example, in response to the first comparison enable signal EN1 having an enable state (for example, a high level), the first sense amplifier 131a may compare the voltage level of the data input signal DQ_RX with the first reference voltage Vref1 to output the first comparison result D_H. In response to the first comparison enable signal EN1 having a disable state (for example, a low level), the first sense amplifier 131a may output a predetermined value (for example, '0') as the first comparison result D_H. Likewise, the second and third sense amplifiers 131b and 131c may respectively output the second and third comparison results D_M and D_L on the basis of the second and third comparison enable signals EN2 and EN3.

For example, in the PAM-4 mode, the first to third comparison enable signals EN1 to EN3 may be generated in an enable state. In this case, the first to third sense amplifiers 131a to 131c may compare the voltage level of the data input signal DQ_RX with the first to third reference voltages Vref1 to Vref3 to output the first to third comparison results D_H, D_M, and D_L. For example, in the NRZ mode, the first and third comparison enable signals EN1 and EN3 may be generated in a disable state, and the second comparison enable signal EN2 may be generated in an enable state. In this case, the first and third sense amplifiers 131a and 131c may output the first and third comparison results D_H and D_L having a predetermined value (for example, '0'), and the second sense amplifier 131b may compare the voltage level of the data input signal DQ_RX with the second reference voltage Vref2 to output the second comparison result D_M.

The decoder 132 may perform decoding on the first to third comparison results D_H, D_M, and D_L on the basis of a decoding rule to generate a most significant bit MSB and a least significant bit LSB. The decoding rule may be predetermined. The decoder 132 may be referred to as a PAM-4 decoder. For example, the most significant bit MSB and the least significant bit LSB generated based on the first to third comparison results D_H, D_M, and D L in the PAM-4 mode may all have valid values. For example, the most significant bit MSB generated based on the first to third comparison results D_H, D_M, and D_L in the NRZ mode may have a valid value, and the least significant bit LSB may have an invalid value. That is, in the PAM-4 mode, two valid bits may be output as the most significant bit MSB and the least significant bit LSB in parallel, and in the NRZ mode, one bit of the two valid bits may be output as the most significant bit MSB at a first timing and the other bit may be output as the most significant bit MSB at a second timing.

As illustrated in FIG. 7, three sense amplifiers 131a to 131c may be used for obtaining two bits (i.e., the most significant bit MSB and the least significant bit LSB) from the data input signal DQ_RX in the PAM-4 mode. However, embodiments are not limited thereto, and (N−1) number of sense amplifiers (i.e., first to (N−1)$^{th}$ sense amplifiers) may be used for obtaining n from the data input signal DQ_RX in the PAM-N mode. In this case, in the PAM-N mode, the first to (N−1)$^{th}$ sense amplifiers may respectively compare the voltage level of the data input signal DQ_RX with first to (N−1)$^{th}$ reference voltages to output first to (N−1)$^{th}$ comparison results, and in the NRZ mode, the first to (N−1)$^{th}$ sense amplifiers may compare the voltage level of the data input signal DQ_RX with a certain reference voltage (for example, a reference voltage having an intermediate level) of the first to (N−1)$^{th}$ reference voltages to output the first to (N−1)$^{th}$ comparison results. In the NRZ mode, the first to (N−1)$^{th}$ sense amplifiers may output, as a predetermined value (for example, '0'), each of comparison results other than a comparison result corresponding to a certain reference voltage of the first to (N−1)$^{th}$ reference voltages. The decoder 132 may perform decoding on the basis of (N−1) number of comparison results to output n bits.

Figure 8:
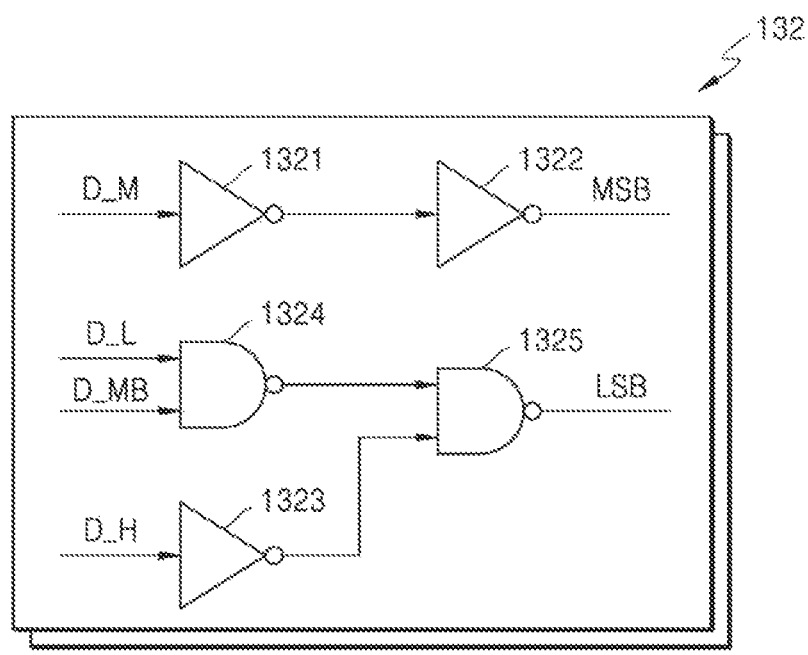
FIG. 8 is a block diagram illustrating a decoder according to an embodiment.

FIG. 8 is a block diagram illustrating a decoder 132 according to an embodiment.

Referring to FIG. 8, the decoder 132 may include a first inverter 1321, a second inverter 1322, and a third inverter 1323 and a first NAND gate 1324 and a second NAND gate 1325. The first inverter 1321 may invert a second comparison result D_M, and the second inverter 1321 may invert an output of the first inverter 1321, thereby generating a most significant bit MSB. The first NAND gate 1324 may perform an NAND operation on a third comparison result D_L and a second inversion comparison result D_MB, and the third inverter 1323 may invert a first comparison result D_H. The second NAND gate 1325 may perform a NAND operation on an output of the first NAND gate 1324 and an output of the third inverter 1323 to generate a least significant bit LSB.

In some embodiments, the first sense amplifier 131a may sample a data input signal DQ_RX on the basis of a plurality of 4-phase clock signals (i.e., a plurality of first internal clock signals iCK[0] to iCK[3] respectively having different phases) to generate a first comparison result D_H<3:0>. Likewise, the second sense amplifier 131b may sample the data input signal DQ_RX on the basis of the plurality of 4-phase clock signals (i.e., the first internal clock signals iCK[0] to iCK[3] respectively having different phases) to generate a second comparison result D_M<3:0>. Furthermore, the third sense amplifier 131c may sample the data input signal DQ_RX on the basis of the plurality of 4-phase clock signals (i.e., the first internal clock signals iCK[0] to iCK[3] respectively having different phases) to generate a third comparison result D_L<3:0>.

Therefore, the decoder 132 may be implemented with four decoders (i.e., a first decoder, a second decoder, a third decoder, and a fourth decoder). For example, the first decoder may decode first to third comparison results D_H[0] to D_L[0], the second decoder may decode first to third comparison results D_H[1] to D_L[1], the third decoder may decode first to third comparison results D_H[2] to D_L[2], and the fourth decoder may decode first to third comparison results D_H[3] to D_L[3]. Therefore, the first to fourth decoders may generate MSB<3:0> and LSB<3:0>.

Figure 9:
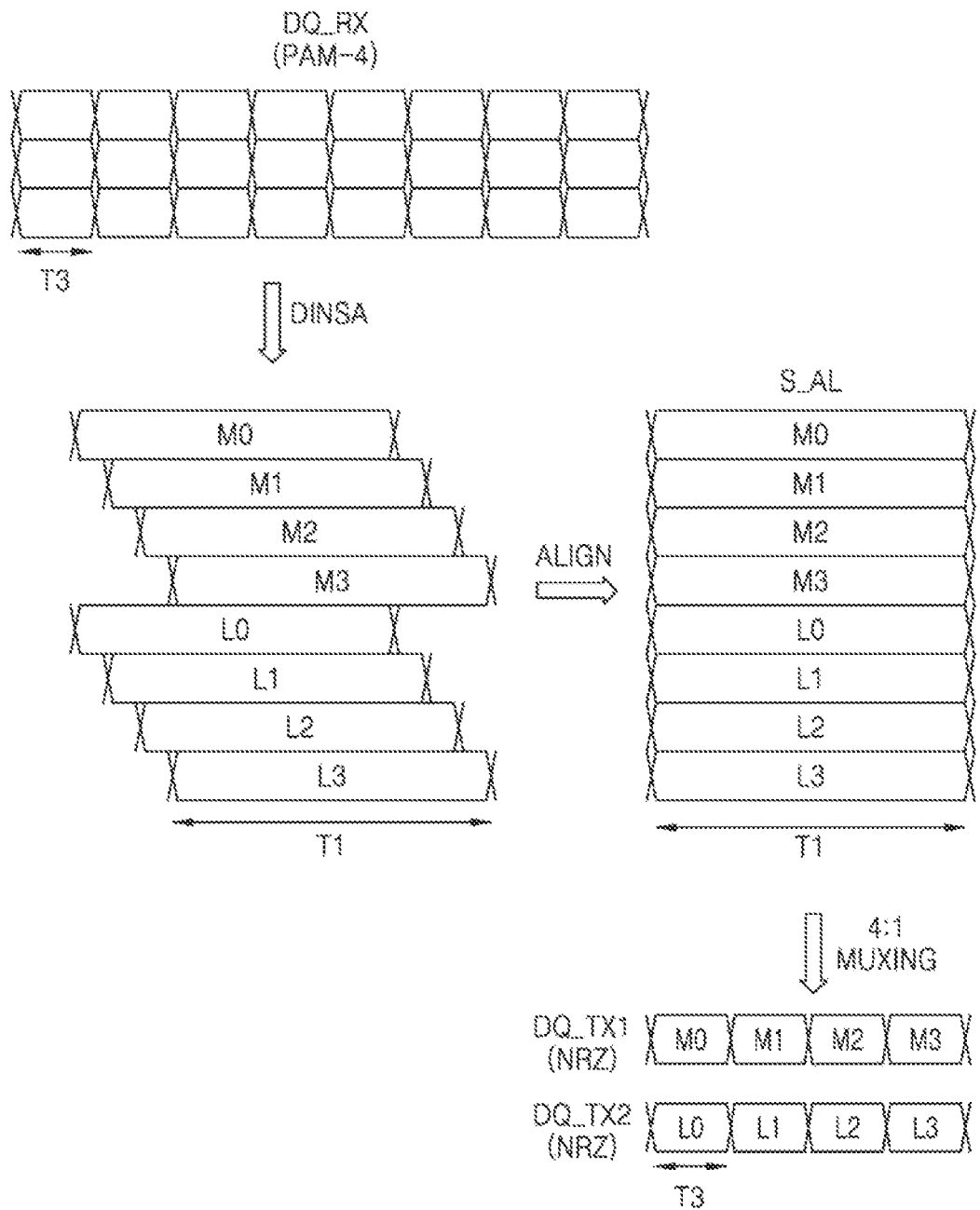
FIG. 9 exemplarily illustrates an operation of translating a data input signal of the PAM-4 mode into a plurality of data output signals of the NRZ mode, according to an embodiment.

FIG. 9 exemplarily illustrates an operation of translating a data input signal DQ_RX based on the PAM-4 mode into a plurality of data output signals DQ_TX1 and DQ_TX2 based on the NRZ mode, according to an embodiment.

Referring to FIG. 9 in conjunction with FIGS. 5 and 6, for example, a data transfer rate of the data input signal DQ_RX based on the PAM-4 mode may correspond to about 5 Gbps. Each symbol in the data input signal DQ_RX based on the PAM-4 mode may include two bits (i.e., a most significant bit and a least significant bit), and thus, a baud rate of the data input signal DQ_RX may correspond to about 2.5 GBaud/s. In this case, a symbol duration or a symbol interval of the data input signal DQ_RX may be T3 (for example, 400 ps).

The second I/O circuit 130a may perform a sense amplification operation DINSA on the data input signal DQ_RX on the basis of a plurality of first internal clock signals iCK1[0] to iCK1[3] to generate most significant bits M0 to M3 and least significant bits L0 to L3. In this case, a frequency of each of the first internal clock signals iCK1[0] to iCK1[3] may be about 0.625 GHz and a toggling duration or toggling period thereof may about 1.6 ns, and thus, a sampling duration or sampling period of the second I/O circuit 130a may be about 1.6 ns. Based on the sampling period of the second I/O circuit 130a, each of the most significant bits M0 to M3 and the least significant bits L0 to L3 may maintain a signal level during T1 (for example, 1.6 ns).

The aligner 121 may align the most significant bits M0 to M3 and the least significant bits L0 to L3 on the basis of a first internal clock signal iCK1 to generate an aligned signal S_AL. In this case, the aligned signal S_AL may maintain a signal level during T1 (for example, 1.6 ns). Based on a second internal clock signal iCK2, the data selector 122 may provide the first multiplexer 123a with the most significant bits M0 to M3 as a first selected signal S_SEL1 in the aligned signal S_AL and may provide the second multiplexer 123a with the least significant bits L0 to L3 as a second selected signal S_SEL2 in the aligned signal S_AL.

The first multiplexer 123a may perform 4:1 multiplexing on the first selected signal S_SEL1 on the basis of a third internal clock signal iCK3 to generate a first data output OUT1. The second multiplexer 123b may perform 4:1 multiplexing on the second selected signal S_SEL2 on the basis of the third internal clock signal iCK3 to generate a second data output OUT2. The first transmitter TX1 may generate a first data output signal DQ_TX1 from the first data output OUT1. The second transmitter TX2 may generate a second data output signal DQ_TX2 from the second data output OUT2.

The first data output signal DQ_TX1 may sequentially output the most significant bits M0 to M3, and each bit may maintain a signal level during T3 (for example, 400 ps). The second data output signal DQ_TX2 may sequentially output the least significant bits L0 to L3, and each bit may maintain a signal level during T3 (for example, 400 ps). As described above, a data transfer rate of each of the first and second data output signals DQ_TX1 and DQ_TX2 may be about 2.5 Gbps and the first and second data output signals DQ_TX1 and DQ_TX2 may be transferred in parallel, and thus, a total data transfer rate may correspond to about 5 Gbps. Therefore, a transfer rate of a data output signals DQ_RX based on the PAM-4 mode and a transfer rate of each of the first and second data output signals DQ_TX1 and DQ_TX2 based on the NRZ mode may be maintained to be constant.

Figure 10:
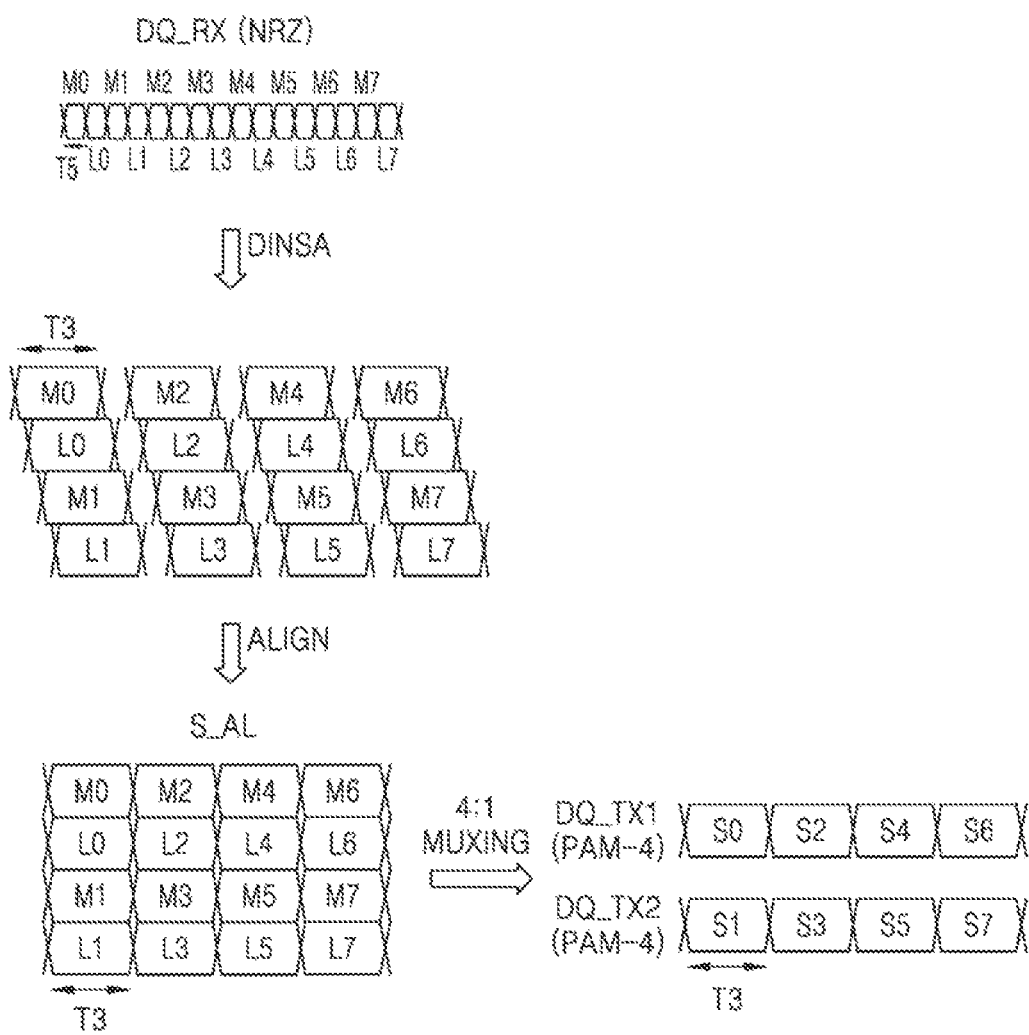
FIG. 10 exemplarily illustrates an operation of translating a data input signal of the NRZ mode into a plurality of data output signals of the PAM-4 mode, according to an embodiment.

FIG. 10 exemplarily illustrates an operation of translating a data input signal DQ_RX based on the NRZ mode into a plurality of data output signals DQ_TX1 and DQ_TX2 based on the PAM-4 mode, according to an embodiment.

Referring to FIG. 10 in conjunction with FIGS. 5 and 6, for example, a data transfer rate of the data input signal DQ_RX based on the NRZ mode may correspond to about 10 Gbps. For example, a bit interval in the data input signal DQ_RX may be T5 (for example, 100 ps). The second I/O circuit 130a may perform a sense amplification operation DINSA on the data input signal DQ_RX on the basis of a plurality of first internal clock signals iCK1[0] to iCK1[3] to generate a plurality of bits M0 to M7 and L0 to L7. For example, a frequency of each of the first internal clock signals iCK1[0] to iCK1[3] may be about 2.5 GHz and a toggling duration or toggling period thereof may about 400 ps, and thus, a sampling period of the second I/O circuit 130a may be about 400 ps. Based on the sampling period of the second I/O circuit 130a, each of the plurality of bits M0 to M7 and L0 to L7 may maintain a signal level during T3 (for example, 400 ps).

The aligner 121 may align the plurality of bits M0 to M7 and L0 to L7 on the basis of a first internal clock signal iCK1 to generate an aligned signal S_AL. In this case, the aligned signal S_AL may maintain a signal level during T3 (for example, 400 ps). Based on a second internal clock signal iCK2, the data selector 122 may provide the first multiplexer 123a with even bits M0, M2, M4, M6, L0, L2, L4, and L6 as a first selected signal S_SEL1 in the aligned signal S_AL and may provide the second multiplexer 123a with odd bits M1, M3, M5, M7, L1, L3, L5, and L7 as a second selected signal S_SEL2 in the aligned signal S_AL.

The first multiplexer 123a may perform 4:1 multiplexing on the first selected signal S_SEL1 on the basis of a third internal clock signal iCK3 to generate a first data output OUT1. The second multiplexer 123b may perform 4:1 multiplexing on the second selected signal S_SEL2 on the basis of the third internal clock signal iCK3 to generate a second data output OUT2. The first transmitter TX1 may generate a first data output signal DQ_TX1 from the first data output OUT1. The second transmitter TX2 may generate a second data output signal DQ_TX2 from the second data output OUT2.

The first data output signal DQ_TX1 may sequentially output even symbols S0, S2, S4, and S6 corresponding to the even bits M0, M2, M4, M6, L0, L2, L4, and L6, and a symbol duration thereof may correspond to T3 (for example, 400 ps). The second data output signal DQ_ may sequentially output odd symbols S1, S3, S5, and S7 corresponding to the odd bits M1, M3, M5, M7, L1, L3, L5, and L7, and a symbol duration thereof may correspond to T3. As described above, a baud rate of each of the first and second data output signals DQ_TX1 and DQ_TX2 may be about 2.5 GBaud/s and the first and second data output signals DQ_TX1 and DQ_TX2 may be transferred in parallel, and thus, a total data transfer rate may correspond to about 10 Gbps. Therefore, a transfer rate of a data output signals DQ_RX based on the NRZ mode and a transfer rate of each of the first and second data output signals DQ_TX1 and DQ_TX2 based on the PAM-4 mode may be maintained to be constant.

Figure 11:
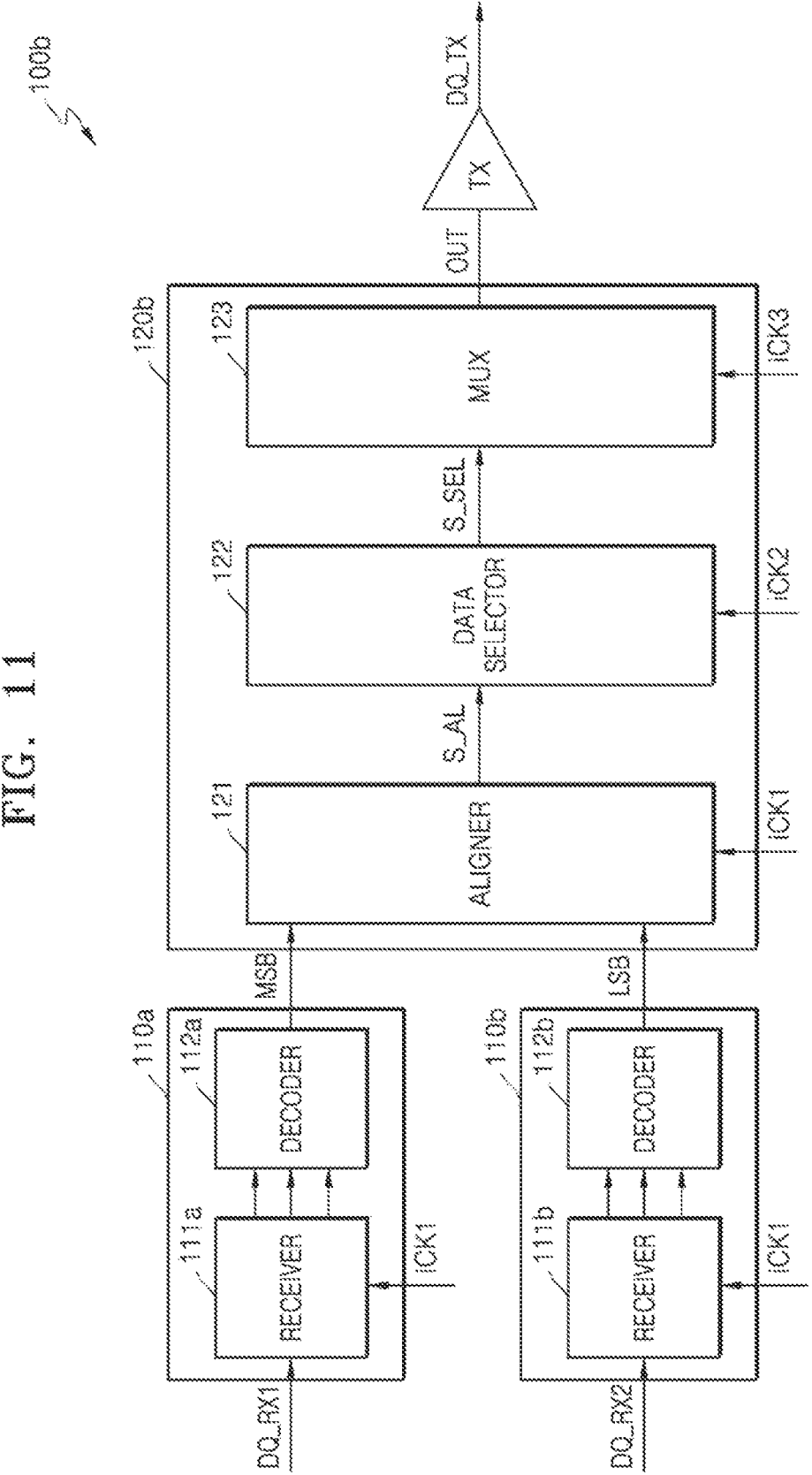
FIG. 11 is a block diagram illustrating in detail a BOT module according to an embodiment.

FIG. 11 is a block diagram illustrating in detail a BOT module 100b according to an embodiment.

Referring to FIG. 11 in conjunction with FIG. 3, for example, the BOT module 100b may receive a first data input signal DQ_RX1 and a second data input signal DQ_RX2 through the first and second pins P11 and P12 and may output a data output signal DQ_TX through the third pin P13. A first I/O circuit 110a may include a receiver 111a and a decoder 112a, and a first I/O circuit 110b may include a receiver 111b and a decoder 112b. The receivers 111a and 111b may respectively sample the first and second data input signals DQ_RX1 and DQ_RX2 on the basis of a first internal clock signal iCK1, and the decoders 112a and 112b may decode sampled first and second data input signals to respectively generate a most significant bit MSB and a least significant bit LSB.

A translation circuit 120b may include an aligner 121, a data selector 122, and a multiplexer (MUX) 123. The aligner 121 may generate an aligned signal S_AL from the most significant bit MSB and the least significant bit LSB on the basis of the first internal clock signal iCK1. The data selector 122 may generate a selected signal S_SEL from the aligned signal S_AL on the basis of a second internal clock signal iCK2. The multiplexer 123 may generate a data output OUT from the selected signal S_SEL. A transmitter TX may generate the data output signal DQ_TX from the data output OUT. For example, the transmitter TX may be included in the second I/O circuit 130a.

Figure 12:
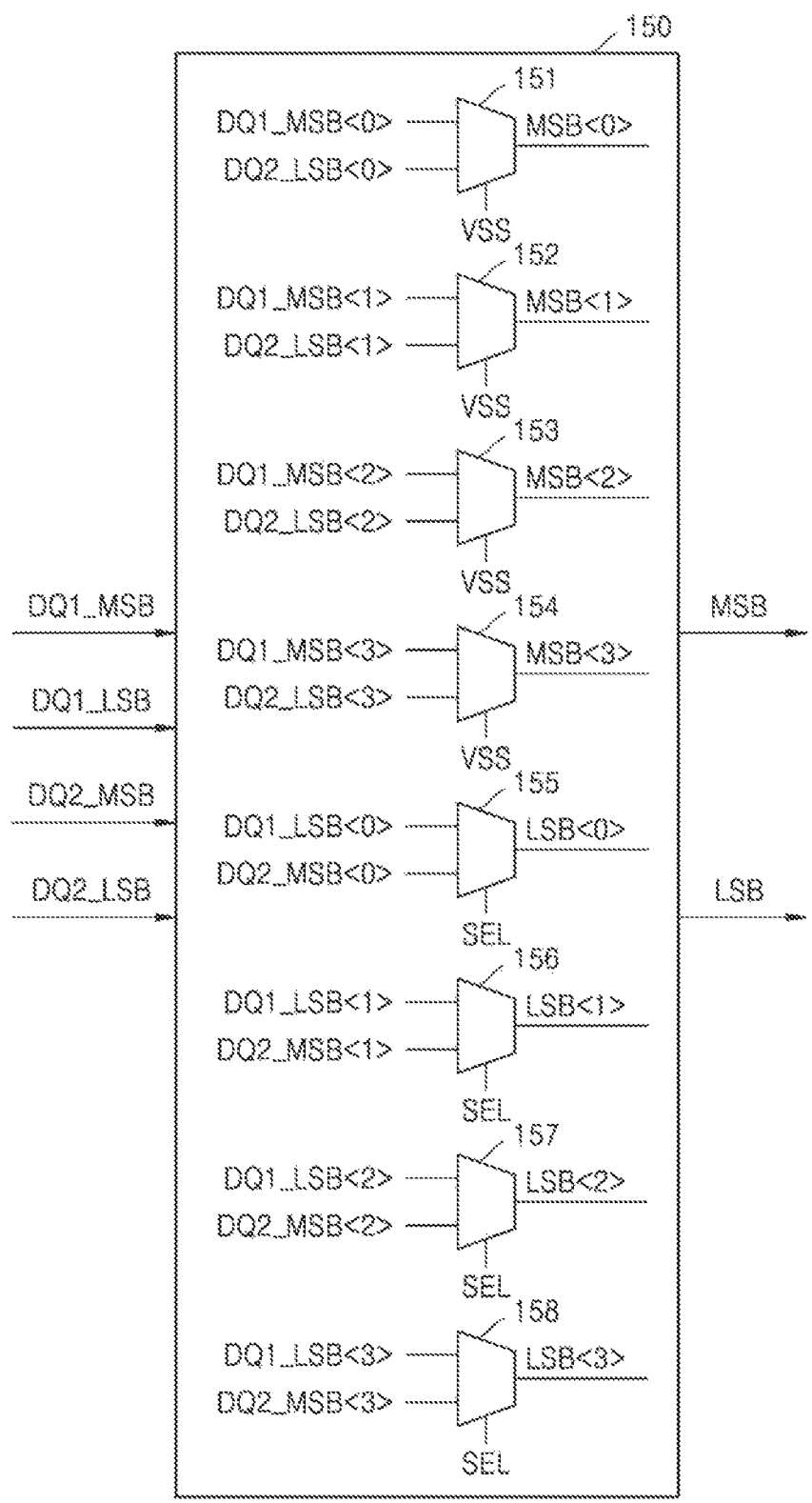
FIG. 12 is a block diagram illustrating a selector according to an embodiment.

FIG. 12 is a block diagram illustrating a selector 150 according to an embodiment.

Referring to FIG. 12 in conjunction with FIG. 11, in some embodiments, a selector 150 may be disposed between a plurality of decoders 112a and 112b and an aligner 121. (It is noted that the selector 150 is not illustrated in FIG. 11.) The selector 150 may receive a first most significant bit DQ1_MSB and a first least significant bit DQ1_LSB from the decoder 112a and may receive a second most significant bit DQ2_MSB and a second least significant bit DQ2_LSB from the decoder 112b. The first most significant bit DQ1 MSB and the first least significant bit DQ1_LSB may be generated from a first data input signal DQ_RX1, and the second most significant bit DQ2_MSB and the second least significant bit DQ2_LSB may be generated from a second data input signal DQ_RX2. The selector 150 may generate a most significant bit MSB and a least significant bit LSB from the first and second most significant bits DQ1_MSB and DQ2_MSB and the first and second least significant bits DQ1_LSB and DQ2_LSB and may provide the generated most significant bit MSB and least significant bit LSB to the aligner 121.

In detail, the selector 150 may include a first multiplexer 151, a second multiplexer 152, a third multiplexer 153, a fourth multiplexer 154, a fifth multiplexer 155, a sixth multiplexer 156, a seventh multiplexer 157, and an eighth multiplexer 158. The first to eighth multiplexers 151 to 158 may output first most significant bits DQ1_MSB<0> to DQ1_MSB<3> as most significant bits MSB<0> to MSB<3> on the basis of a ground signal VSS. The fifth to eighth multiplexers 155 to 158 may output first least significant bits DQ1_LSB<0> to DQ1_LSB<3> or second most significant bits DQ2_MSB<0> or DQ2_MSB<3> as least significant bits LSB<0> to LSB<3>. Therefore, the most significant bit MSB may include the most significant bits MSB<0> to MSB<3>, and the least significant bit LSB may include the least significant bits LSB<0> to LSB<3>.

Figure 13:
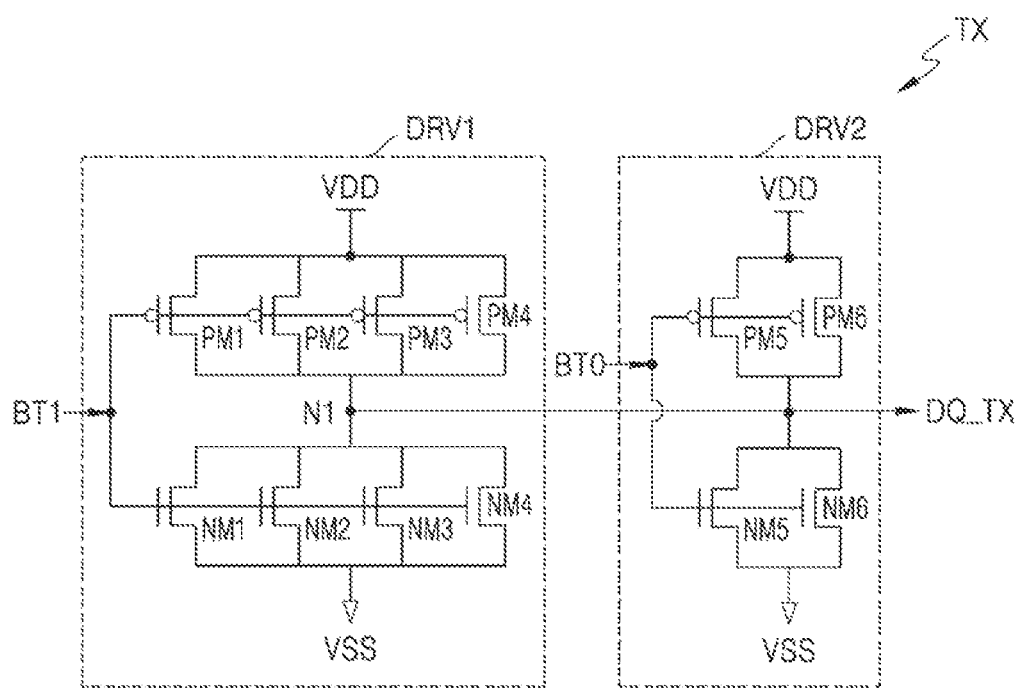
FIG. 13 is a circuit diagram illustrating a transmitter according to an embodiment.

FIG. 13 is a circuit diagram illustrating a transmitter TX according to an embodiment.

Referring to FIG. 13, the transmitter TX may include a first driver DRV1 and a second driver DRV2. The first driver DRV1 may include a first P-type (PMOS) transistor PM1, a second P-type (PMOS) transistor PM2, a third P-type (PMOS) transistor PM3, and a fourth P-type (PMOS) transistor PM4 and a first N-type (NMOS) transistor NM1, a second N-type (NMOS) transistor NM2, a third N-type (NMOS) transistor NM3, and a fourth N-type (NMOS) transistor NM4. When a second bit BT1 is '0', the first to fourth PMOS transistors PM1 to PM4 may be turned on and may pull up a voltage of a first node N1 on the basis of a source voltage VDD. In this case, the first to fourth NMOS transistors NM1 to NM4 may be turned off. When the second bit BT1 is '1', the first to fourth NMOS transistors NM1 to NM4 may be turned on and may pull down the voltage of the first node N1 on the basis of a ground voltage VSS. In this case, the first to fourth PMOS transistors PM1 to PM4 may be turned off The second driver DRV2 may include a fifth PMOS transistor PM5 and a sixth PMOS transistor PM6 and a fifth NMOS transistor NM5 and a sixth NMOS transistor NM6. When a first bit BT0 is '0', the fifth and sixth PMOSs PM5 and PM6 may be turned on and may pull up the voltage of the first node N1 on the basis of a source voltage VDD. In this case, the fifth and sixth NMOSs NM5 and NM6 may be turned off. When the first bit BT0 is '1', the fifth and sixth NMOSs NM5 and NM6 may be turned on and may pull down the voltage of the first node N1 on the basis of the ground voltage VSS. In this case, the fifth and sixth PMOSs PM5 and PM6 may be turned off.

As illustrated in FIG. 13, the first driver DRV1 may include more transistors for pull-up and pull-down than the second driver DRV2, and thus, a pull-up level and a pull-down level of the first node N1 by the first driver DRV1 may be greater than a pull-up level and a pull-down level of the first node N1 by the second driver DRV2. Therefore, the voltage of the first node N1 may have one of first to fourth voltage levels VL1 to VL4 on the basis of a first bit BT0 and a second bit BT1 which are generated in the PAM-4 mode, and a data output signal DQ_TX having one of the first to fourth voltage levels VL1 to VL4 may be generated. Also, the voltage of the first node N1 may have one of first and fourth voltage levels VL1 and VL4 on the basis of a first bit BT0 and a second bit BT1 which are generated in the NRZ mode, and the data output signal DQ_TX having one of the first and fourth voltage levels VL1 and VL4 may be generated.

Figure 14:
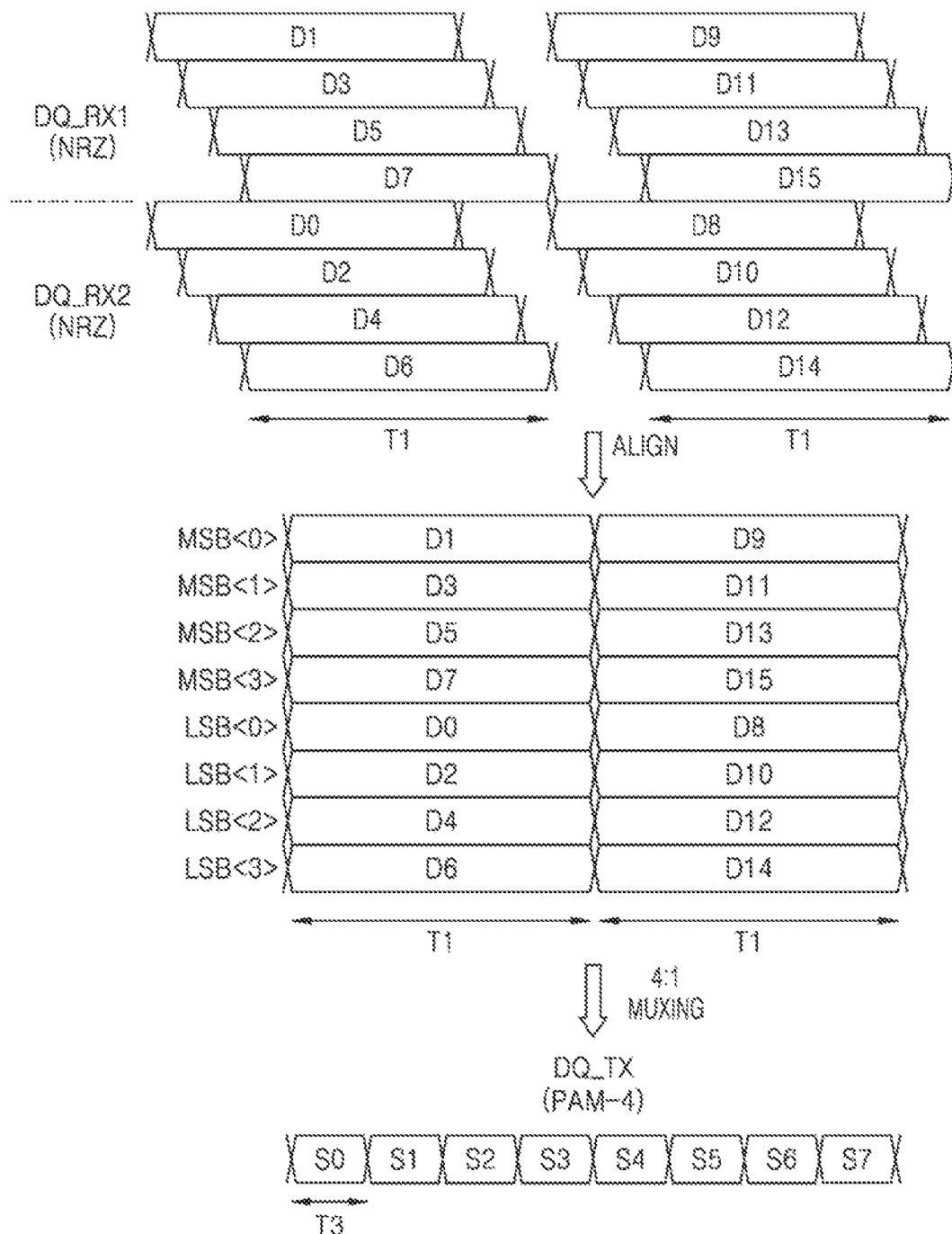
FIG. 14 exemplarily illustrates an operation of translating a plurality of data input signals of the NRZ mode into a data output signal of the PAM-4 mode, according to an embodiment.

FIG. 14 exemplarily illustrates an operation of translating a plurality of data input signals DQ_RX1 and DQ_RX2 based on the NRZ mode into a data output signal DQ_TX based on the PAM-4 mode, according to an embodiment.

Referring to FIG. 14 in conjunction with FIG. 11, a first data input signal DQ_RX1 of the NRZ mode may include odd bits D1 to D15, and a second data input signal DQ_RX2 of the NRZ mode may include even bits D2 to D14. For example, in the first and second data input signals DQ_RX1 and DQ_RX2, a bit interval may correspond to T3 (for example, 400 ps). The first I/O circuit 110a may sample the first data input signal DQ_RX1 on the basis of a first internal clock signal iCK having, for example, a frequency of about 0.625 GHz to output odd bits where each bit interval is T1 (for example, 1.6 ns). The first I/O circuit 110b may sample the second data input signal DQ_RX2 on the basis of the first internal clock signal iCK having, for example, a frequency of about 0.625 GHz to output even bits where each bit interval is T1.

The aligner 121 may receive, as a most significant bit MSB, odd bits generated in the first I/O circuit 110a, receive, as a least significant bit LSB, even bits generated in the first I/O circuit 110b, and align the most significant bit MSB and the least significant bit LSB on the basis of a first internal clock signal iCK1 to generate an aligned signal S_AL. The data selector 122 may provide the aligned signal S_AL as a selected signal S_SEL to the multiplexer 123 on the basis of a second internal clock signal iCK2. The multiplexer 123 may perform 4:1 multiplexing on the selected signal S_SEL on the basis of a third internal clock signal iCK3 to generate a data output OUT. For example, a frequency of the third internal clock signal iCK3 may be higher than each of each of the first and second internal clock signals iCK1 and iCK2. For example, a frequency of the third internal clock signal iCK3 may correspond to two times a frequency of the first internal clock signal iCK1.

The transmitter TX may generate the data output signal DQ_TX from the data output OUT. A symbol duration in the data output signal DQ_TX may correspond to T3 (for example, 400 ps). A data transfer rate of each of the first and second data input signals DQ_RX1 and DQ_RX2 may be about 2.5 Gbps and the first and second data input signals DQ_RX1 and DQ_RX2 may be input in parallel, a total data transfer rate may correspond to about 5 Gbps. In this case, a data transfer rate of the data output signal DQ_TX may be about 5 Gbps, and a data transfer rate of each of the first and second data input signals DQ_RX1 and DQ_RX2 may be the same as a data transfer rate of the data output signal DQ_TX.

Figure 15:
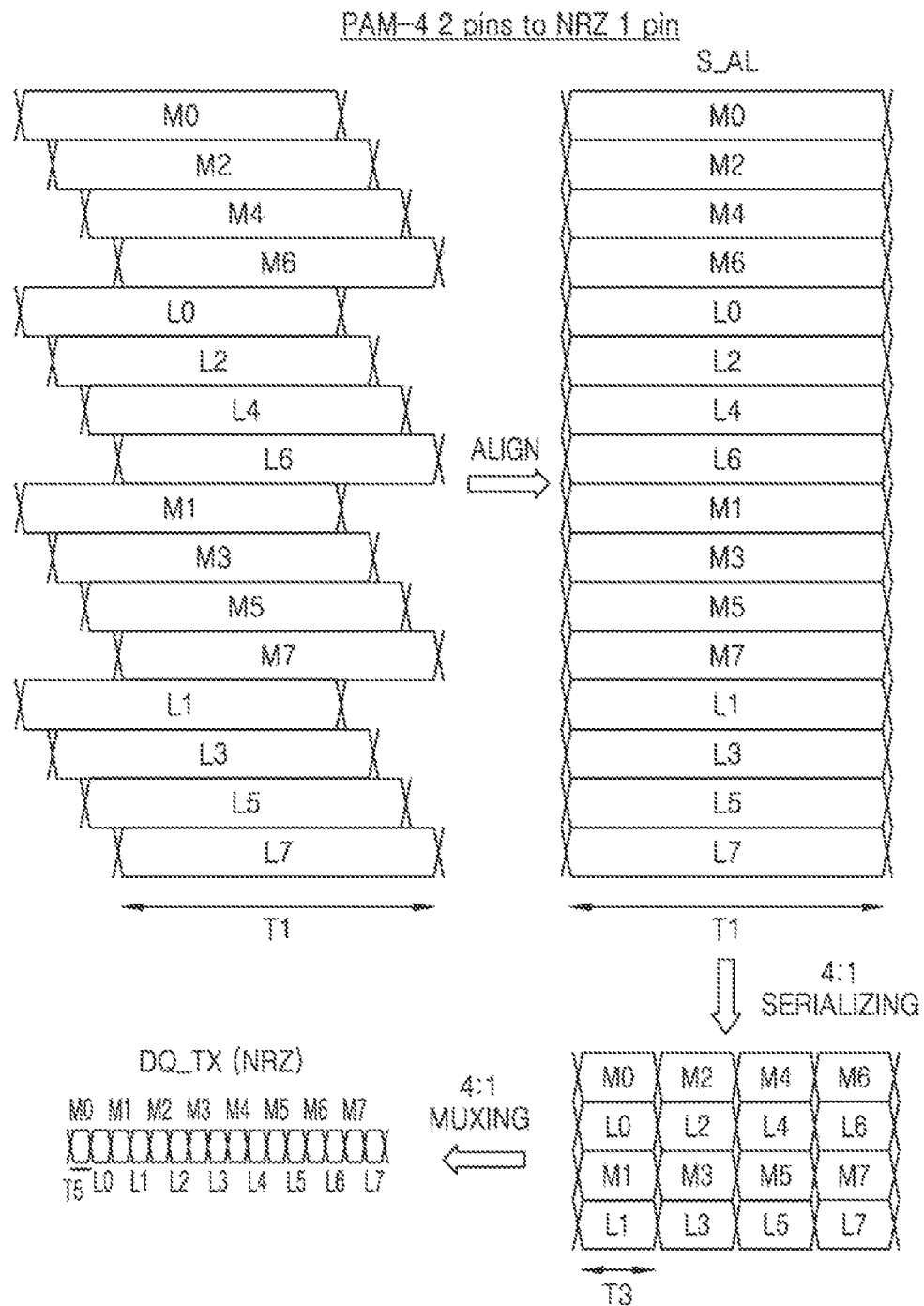
FIG. 15 exemplarily illustrates an operation of translating a plurality of data input signals of the PAM-4 mode into a data output signal of the NRZ mode, according to an embodiment.

FIG. 15 exemplarily illustrates an operation of translating a plurality of data input signals DQ_RX1 and DQ_RX2 based on the PAM-4 mode into a data output signal DQ_TX based on the NRZ mode, according to an embodiment.

Referring to FIG. 15 in conjunction with FIG. 11, for example, a data transfer rate of each of first and second data input signals DQ_RX1 and DQ_RX2 of the PAM-4 mode may correspond to about 5 Gbps, and a total data input rate may be about 10 Gbps. For example, a symbol duration or a symbol interval of each of first and second data input signals DQ_RX1 and DQ_RX2 may be T3 (for example, 400 ps).

The first I/O circuits 110a and 110b may respectively perform a sense amplification operation DINSA on the first and second data input signals DQ_RX1 and DQ_RX2 on the basis of first internal clock signals iCK1[0] to iCK1[3] respectively having first to fourth phases, thereby generating most significant bits M0 to M7 and least significant bits L0 to L7. Also, a frequency of each of the first internal clock signals iCK1[0] to iCK1[3] may be about 0.625 GHz and a toggling duration thereof may about 1.6 ns, and thus, a sampling period of each of the first I/O circuits 110a and 110b may be about 1.6 ns. Based on the sampling period of each of the first I/O circuits 110a and 110b, each of most significant bits M0 to M7 and least significant bits L0 to L7 may maintain a signal level during T1 (for example, 1.6 ns).

The aligner 121 may align the most significant bits M0 to M7 and the least significant bits L0 to L7 on the basis of a first internal clock signal iCK1 to generate an aligned signal S_AL. In this case, the aligned signal S_AL may maintain a signal level during T1 (for example, 1.6 ns). The data selector 122 may perform 4:1 serializing (i.e., serialization) on the aligned signal S_AL on the basis of a second internal clock signal iCK2 to generate a selected signal S_SEL. In the selected signal S_SEL, each bit may maintain a signal level during T3.

The multiplexer 123 may perform 4:1 multiplexing on the selected signal S_SEL on the basis of a third internal clock signal iCK3 to generate a data output OUT. The transmitter TX may generate the data output signal DQ_TX of the NRZ mode from the data output OUT. In the data output signal DQ_TX, each bit may maintain a signal level during T5 (for example, 100 ps). A data transfer rate of the data output signal DQ_TX may be about 10 Gbps. Therefore, a data transfer rate of each of the first and second data input signals DQ_RX1 and DQ_RX2 of the PAM-4 mode and a data transfer rate of the data input signal DQ_TX of the NRZ mode may be maintained to be equal.

Figure 16:
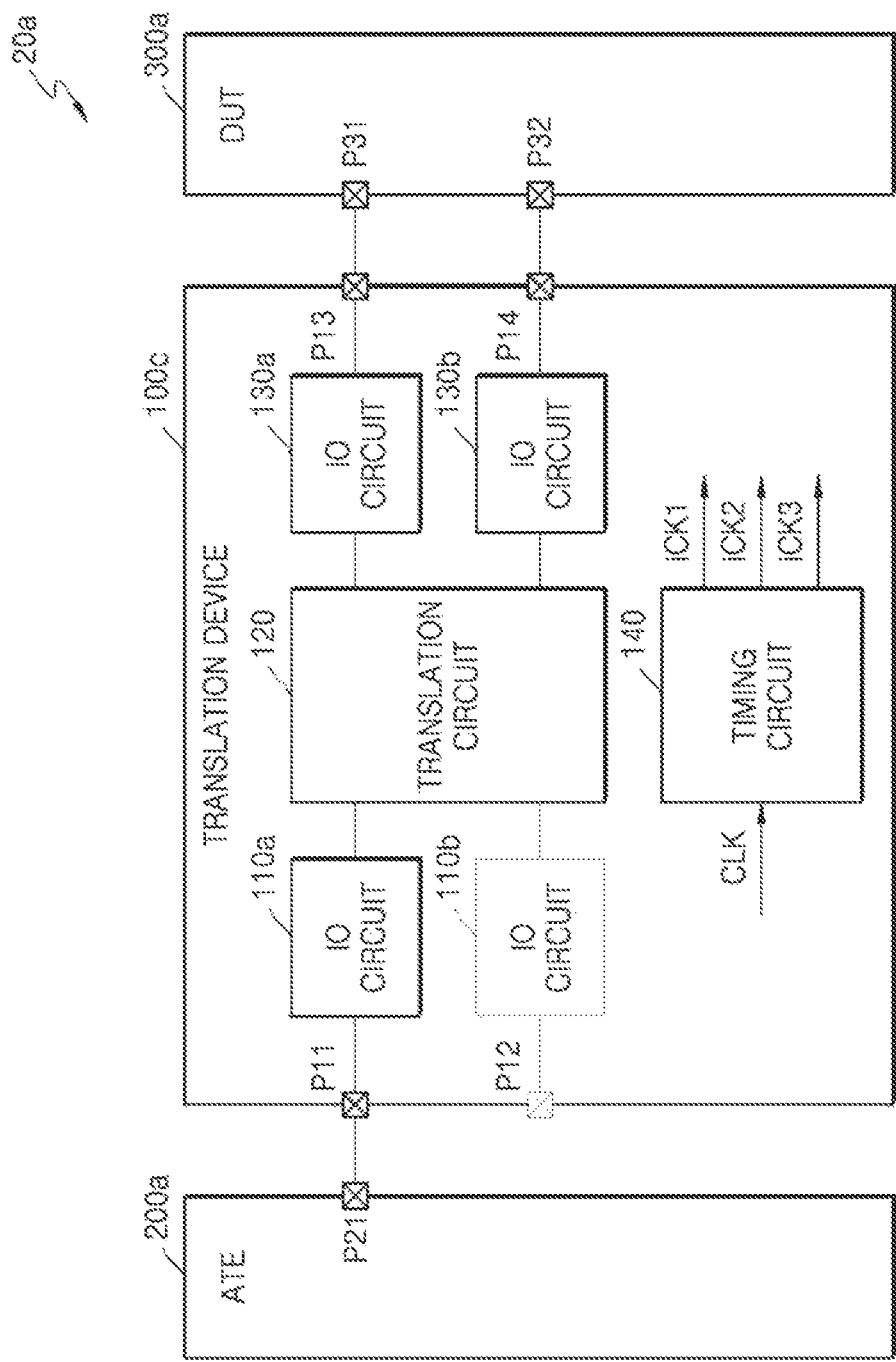
FIG. 16 is a block diagram illustrating a test system according to an embodiment.

FIG. 16 is a block diagram illustrating a test system 20a according to an embodiment.

Referring to FIG. 16, the test system 20a may include an automated test equipment (ATE) 200a, a built out test (BOT) module 100c, and a device under test (DUT) 300a. The test system 20a may correspond to a modified example of the test system 20 of FIG. 3. In FIG. 3, the ATE 200 and the BOT module 100a may transmit or receive I/O signals through two pins. On the other hand, according to the embodiment illustrated in FIG. 16, the ATE 200a and the BOT module 100c may transmit or receive an I/O signal through one pin. Also, in FIG. 3, the DUT 300 and the BOT module 100a may transmit or receive an I/O signal through one pin. On the other hand, according to the embodiment illustrated in FIG. 16, the DUT 300a and the BOT module 100c may transmit or receive I/O signals through two pins. Details described above with reference to FIGS. 3 to 15 may be applied to the embodiment illustrated in FIG. 16, and repetitive descriptions are omitted for conciseness.

Figure 17:
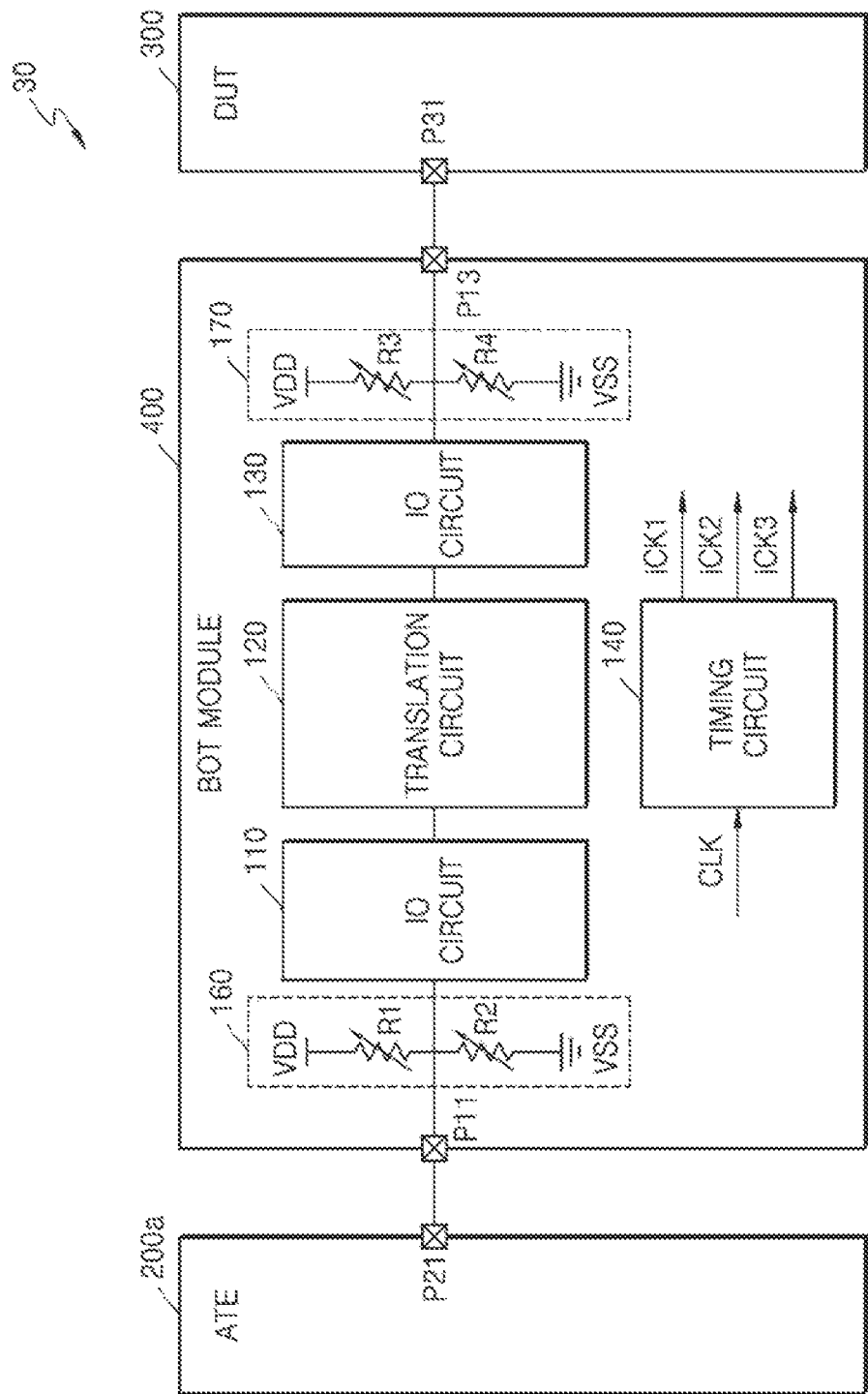
FIGS. 17 and 18 are block diagrams illustrating a test system according to some embodiments.

FIG. 17 is a block diagram illustrating a test system 30 according to an embodiment.

Referring to FIG. 17, the test system 30 may include an automated test equipment (ATE) 200a, a built out test (BOT) module 400, and a device under test (DUT) 300. For example, the ATE 200a and the BOT module 400 may transmit or receive an I/O signal through one pin, and the DUT 300 and the BOT module 400 may transmit or receive an I/O signal through one pin. Details described above with reference to FIGS. 3 to 16 may be applied to the embodiment illustrated in FIG. 17, and repetitive descriptions are omitted for conciseness. For example, in a configuration as illustrated in FIG. 3, a plurality of first I/O circuits 110a and 110b are provided, and in such a configuration, a plurality of the first termination circuits 160 may be respectively provided corresponding to the plurality of first I/O circuits 110a and 110b.

The BOT module 400 may include a first I/O circuit 110, a translation circuit 120, a second I/O circuit 130, a timing circuit 140, and a first termination circuit 160 and a second termination circuit 170. The first termination circuit 160 may include a plurality of variable resistors (for example, a first resistor R1 and a second resistor R2), and the second termination circuit 170 may include a plurality of variable resistors (for example, a third resistor R3 and a fourth resistor R4). The first termination circuit 160 may provide a first termination resistance based on a termination type of the ATE 200a. The second termination circuit 170 may provide a second termination resistance based on a termination type of the DUT 300. While FIG. 17 illustrates one first termination circuit 160 and one second termination circuit 170, embodiments are not limited to this. For example, in a configuration as illustrated in FIG. 3 in which a plurality of first I/O circuits 110a and 110b are provided, a plurality of the first termination circuits 160 may be respectively provided corresponding to the plurality of first I/O circuits 110a and 110b. Similarly, in a configuration in which a plurality of second I/O circuits 130a and 130b are provided, a plurality of the second termination circuit 170 may be respectively provided corresponding to the plurality of second I/O circuits 130a and 130b.

In more detail, a termination type of the first termination circuit 160 may be determined based on a transmitter of the ATE 200a (e.g., the type of a driver), and a termination type of the second termination circuit 170 may be determined based on a transmitter of the DUT 300 (e.g., the type of a driver). The termination type of the first termination circuit 160 may be determined based on a center tapped termination (CTT) type, a pseudo open drain (POD) type, or a low voltage swing termination logic (LVSTL) type. Likewise, the termination type of the second termination circuit 170 may be determined based on the CTT type, the POD type, or the LVSTL type. According to some embodiments, the termination type of the first termination circuit 160 may differ from the termination type of the second termination circuit 170. Also, according to some embodiments, the termination type of the first termination circuit 160 may be the same as the termination type of the second termination circuit 170.

For example, the termination type of the first termination circuit 160 may be determined based on the CTT type. The first resistor R1 may be connected to a source voltage VDD terminal, the second resistor R2 may be connected to a ground voltage VSS terminal, and a first pin P11 may be connected between the first resistor R1 and the second resistor R1. Also, for example, the termination type of the second termination circuit 170 may be determined based on the CTT type. The third resistor R3 may be connected to the source voltage VDD terminal, the fourth resistor R4 may be connected to the ground voltage VSS terminal, and a third pin P13 may be connected between the third resistor R3 and the fourth resistor R4.

Figure 18:
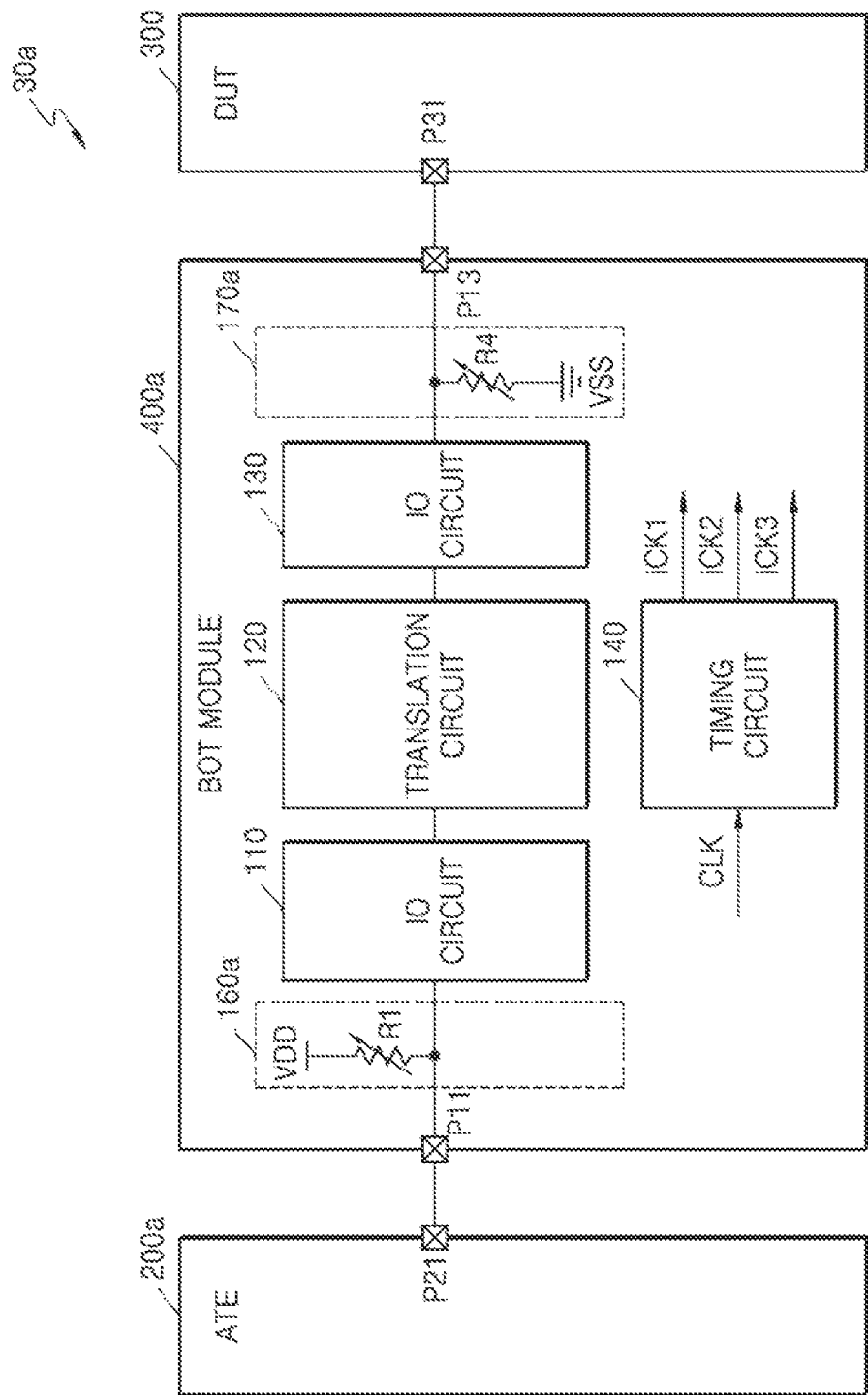

FIG. 18 is a block diagram illustrating a test system 30a according to an embodiment.

Referring to FIG. 18, the test system 30a may include an automated test equipment (ATE) 200a, a built out test (BOT) module 400a, and a device under test (DUT) 300. The test system 30a according to the embodiment of FIG. 18 may correspond to a modified example of the test system 30 of FIG. 17, and details described above with reference to FIG. 17 may be applied to the embodiment illustrated in FIG. 18. The first and second termination circuits 160a and 170a of the BOT module 400a may be implemented to differ from the first and second termination circuits 160 and 170 of the BOT module 400.

For example, the termination type of the first termination circuit 160a may be determined based on the POD type. The first resistor R1 may be connected between the source voltage VDD terminal and the first pin P11. Also, for example, the termination type of the second termination circuit 170a may be determined based on the LVSTL type. The fourth resistor R4 may be connected between the ground voltage VSS terminal and the third pin P13. According to some embodiments, the fourth resistor R4 may be connected to the ground voltage VSS terminal, and thus, may be referred to as a ground type.

Figure 19A:
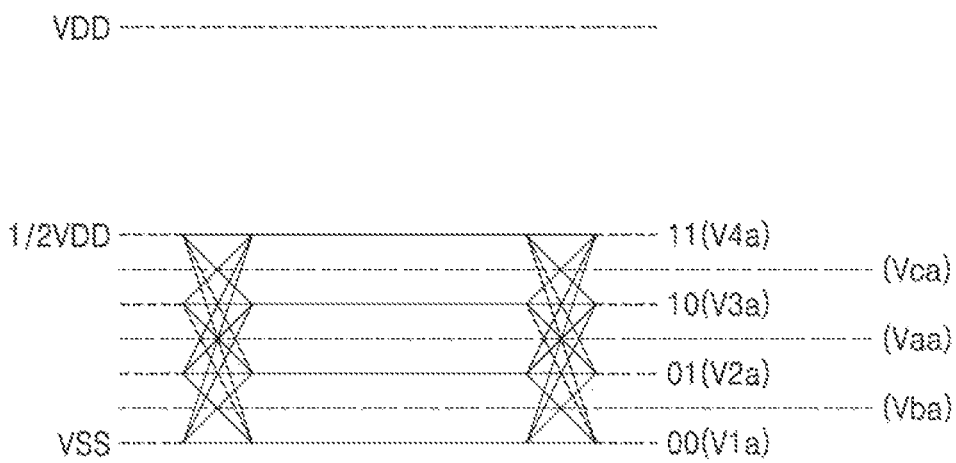
FIGS. 19A to 19C are diagrams for describing first to third swing intervals of a data signal of the PAM-4 mode.
Figure 19B:
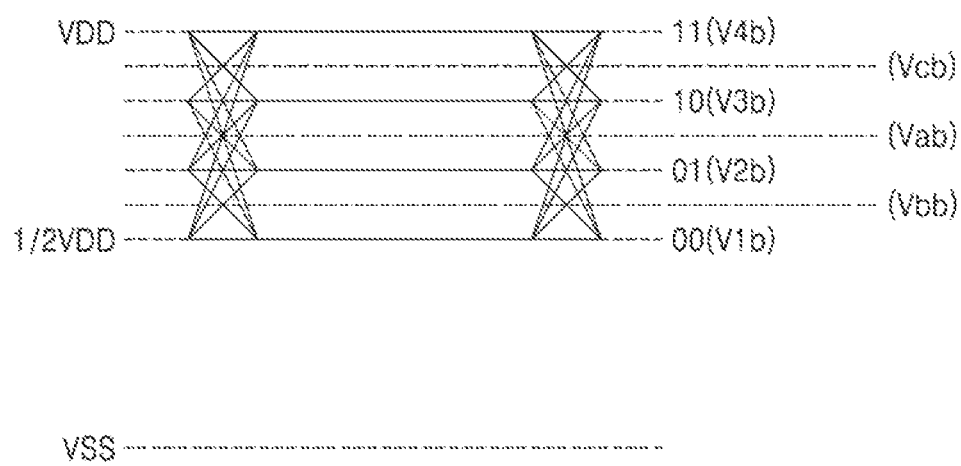
Figure 19C:
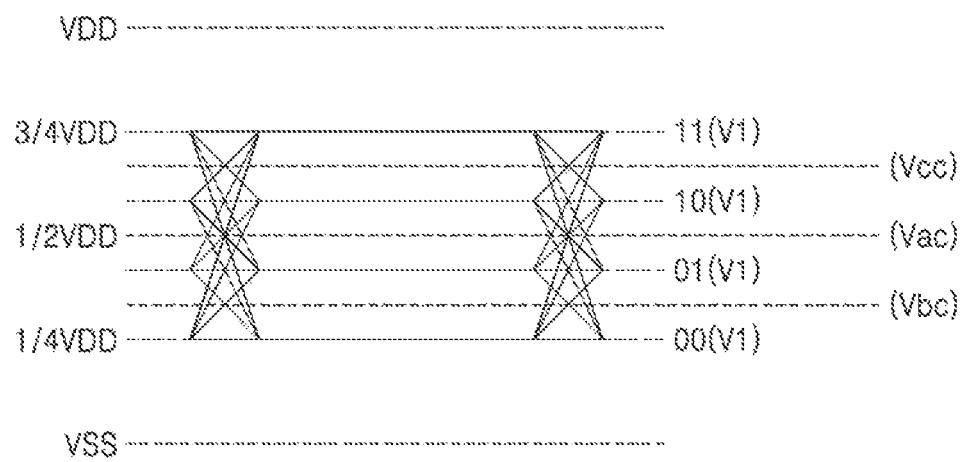

FIGS. 19A to 19C are diagrams for describing first to third swing intervals of a data signal of the PAM-4 mode.

Referring to FIGS. 18 and 19A, for example, a data input signal received through a third pin P13 may have a first swing interval between a ground voltage VSS and ½ of a source voltage or power supply voltage VDD (i.e., VDD/2). For example, a first level V1a corresponding to a lowest level of the data input signal may correspond to the ground voltage VSS, and a fourth level V4a corresponding to a highest level of the data input signal may correspond to ½ of the source voltage VDD. For example, a second level V2a and a third level V3a corresponding to intermediate levels of the data input signal may respectively correspond to ⅙ and ⅓ of the source voltage VDD. As described above, the data input signal may swing at one of the first to fourth levels V1a to V4a in the first swing interval between the ground voltage VSS and ½ of the source voltage VDD. A plurality of reference levels Vaa to Vca may be used for differentiating the first to fourth levels V1a to V4a.

Referring to FIGS. 17 and 19B, for example, a data input signal received through a first pin P11 may have a second swing interval between ½ of a source voltage VDD (i.e., VDD/2) and the source voltage VDD. For example, a first level V1b corresponding to a lowest level of the data input signal may correspond to ½ of the source voltage VDD, and a fourth level V4b corresponding to a highest level of the data input signal may correspond to the source voltage VDD. A second level V2b and a third level V3b corresponding to intermediate levels of the data input signal may respectively correspond to ⅔ and ⅚ of the source voltage VDD. As described above, the data input signal may swing at one of the first to fourth levels V1b to V4b in the second swing interval between ½ of the source voltage VDD (i.e., VDD/2) and the source voltage VDD. A plurality of reference levels Vab to Vcb may be used for differentiating the first to fourth levels V1b to V4b.

Referring to FIGS. 17 and 19C, for example, a data input signal received through a first pin P11 or a data input signal received through a third pin P13 may have a third swing interval between ¼ of a source voltage VDD (i.e., VDD/4) and ¾ of the source voltage VDD (i.e., 3VDD/4). For example, a first level V1c corresponding to a lowest level of the data input signal may correspond to the source voltage VDD, and a fourth level V4c corresponding to a highest level of the data input signal may correspond to ¾ of the source voltage VDD. For example, a second level V2c and a third level V3c corresponding to intermediate levels of the data input signal may respectively correspond to 5/12 and 7/12 of the source voltage VDD. As described above, the data input signal may swing at one of the first to fourth levels V1c to V4c in the third swing interval between ¼ of the source voltage VDD and ¾ of the source voltage VDD. A plurality of reference levels Vac to Vcc may be used for differentiating the first to fourth levels V1c to V4c.

Figure 20A:
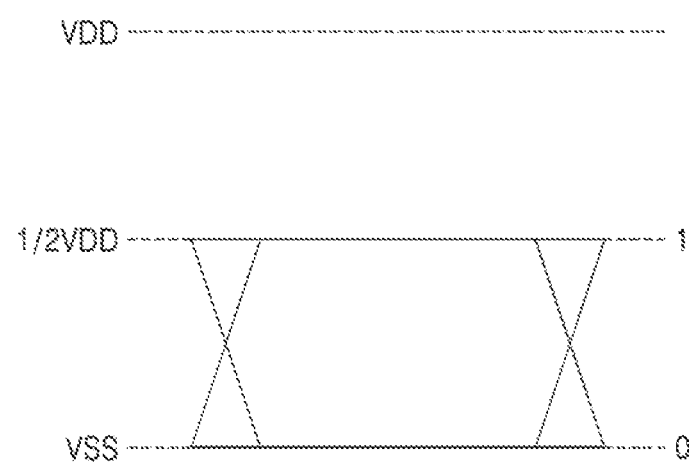
FIGS. 20A to 20C are diagrams for describing first to third swing intervals of a data signal of the NRZ mode.
Figure 20B:
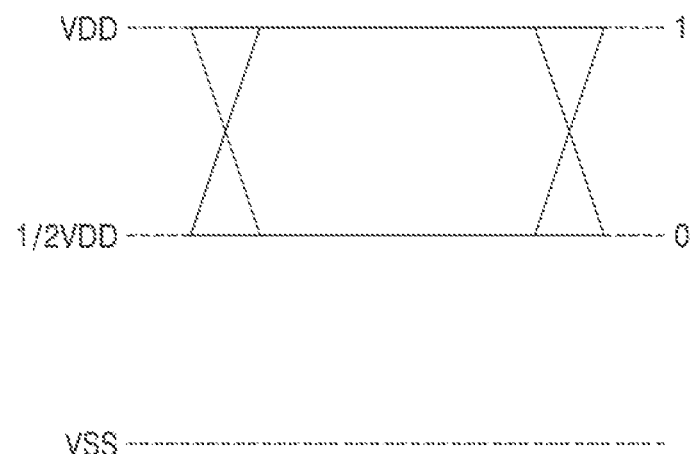
Figure 20C:
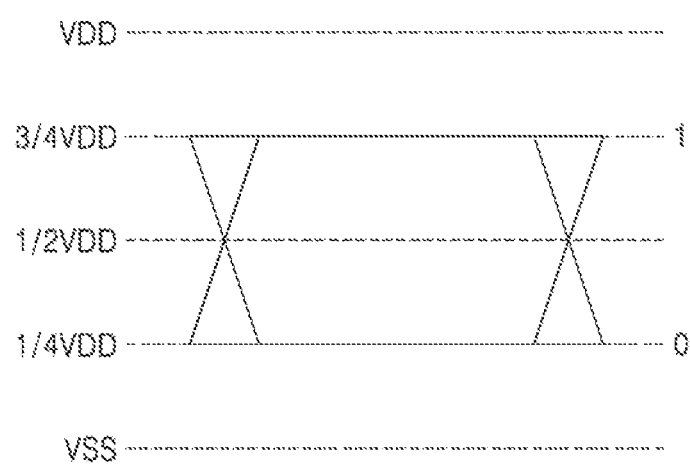

FIGS. 20A to 20C are diagrams for describing first to third swing intervals of a data signal of the NRZ mode.

Referring to FIGS. 18 and 20A, for example, a data input signal received through a third pin P13 may swing in a first swing interval between a ground voltage VSS and ½ of a source voltage VDD (i.e., VDD/2). Referring to FIGS. 18 and 20B, for example, a data input signal received through a first pin P11 may swing in a second swing interval between ½ of a source voltage VDD and the source voltage VDD. Referring to FIGS. 17 and 20C, for example, a data input signal received through a first pin P11 or a data input signal received through a third pin P13 may swing in a third swing interval between ¼ of a source voltage VDD and ¾ of the source voltage VDD.

FIG. 21 is a block diagram illustrating in detail a BOT module 400a according to an embodiment.

Referring to FIG. 21, the BOT module 400a may include a second I/O circuit 130, a translation circuit 120c, and a transmitter TX. The second I/O circuit 130 may receive a data input signal DQ_RX of the PAM-4 and may generate a most significant bit MSB and a least significant bit LSB from the data input signal DQ_RX. For example, a symbol duration of the data input signal DQ_RX may correspond to T3 (for example, 400 ps). Details described above with reference to FIGS. 5 to 8 may be applied to the second I/O circuit 130.

The translation circuit 120c may include an aligner 121, a serializer 122a, and a multiplexer (MUX) 123. The aligner 121 may align the most significant bit MSB and the least significant bit LSB on the basis of a first internal clock signal iCK1 to generate an aligned signal S_AL. The serializer 122a may serialize the aligned signal S_AL on the basis of a second internal clock signal iCK2 to generate a serialized signal S_SE. The multiplexer 123 may perform multiplexing on the serialized signal S_SE on the basis of a third internal clock signal iCK3 to generate a data output OUT.

The transmitter TX may generate the data output signal DQ_TX from the data output OUT. The data output signal DQ_TX may include a plurality of bits which are sequentially output, and a bit duration thereof may be T4 (for example, 200 ps). For example, a symbol SO of the data input signal DQ_RX may correspond to bits M0 and L0 of the data output signal DQ_TX. A symbol duration of the data input signal DQ_RX may correspond to two times a bit duration of the data output signal DQ_TX, and thus, a data transfer rate may be maintained to be constant.

FIG. 22 is a block diagram illustrating a serializer 122a according to an embodiment.

Referring to FIG. 22, the serializer 122a may include a first multiplexer 1221, a second multiplexer 1222, a third multiplexer 1223, and a fourth multiplexer 1224, and each of the first to fourth multiplexers 1221 to 1224 may perform a 2:1 multiplexing operation on the basis of the second internal clock signal iCK2. In detail, the first multiplexer 1221 may output a first input signal PMA-4_M2 in an enable interval of the second internal clock signal iCK2 and may output a second input signal PMA-4_M0 in a disable interval of the second internal clock signal iCK2, thereby outputting a serialized NRZ signal NRZ<0>. The second multiplexer 1222 may output a first input signal PMA-4_L2 in the enable interval of the second internal clock signal iCK2 and may output a second input signal PMA-4_L0 in the disable interval of the second internal clock signal iCK2, thereby outputting a serialized NRZ signal NRZ<1>. The third multiplexer 1223 may output a first input signal PMA-4_M3 in the enable interval of the second internal clock signal iCK2 and may output a second input signal PMA-4_M1 in a disable interval of the second internal clock signal iCK2, thereby outputting a serialized NRZ signal NRZ<2>. The fourth multiplexer 1224 may output a first input signal PMA-4_L3 in the enable interval of the second internal clock signal iCK2 and may output a second input signal PMA-4_L1 in the disable interval of the second internal clock signal iCK2, thereby outputting a serialized NRZ signal NRZ<3>.

Figure 23:
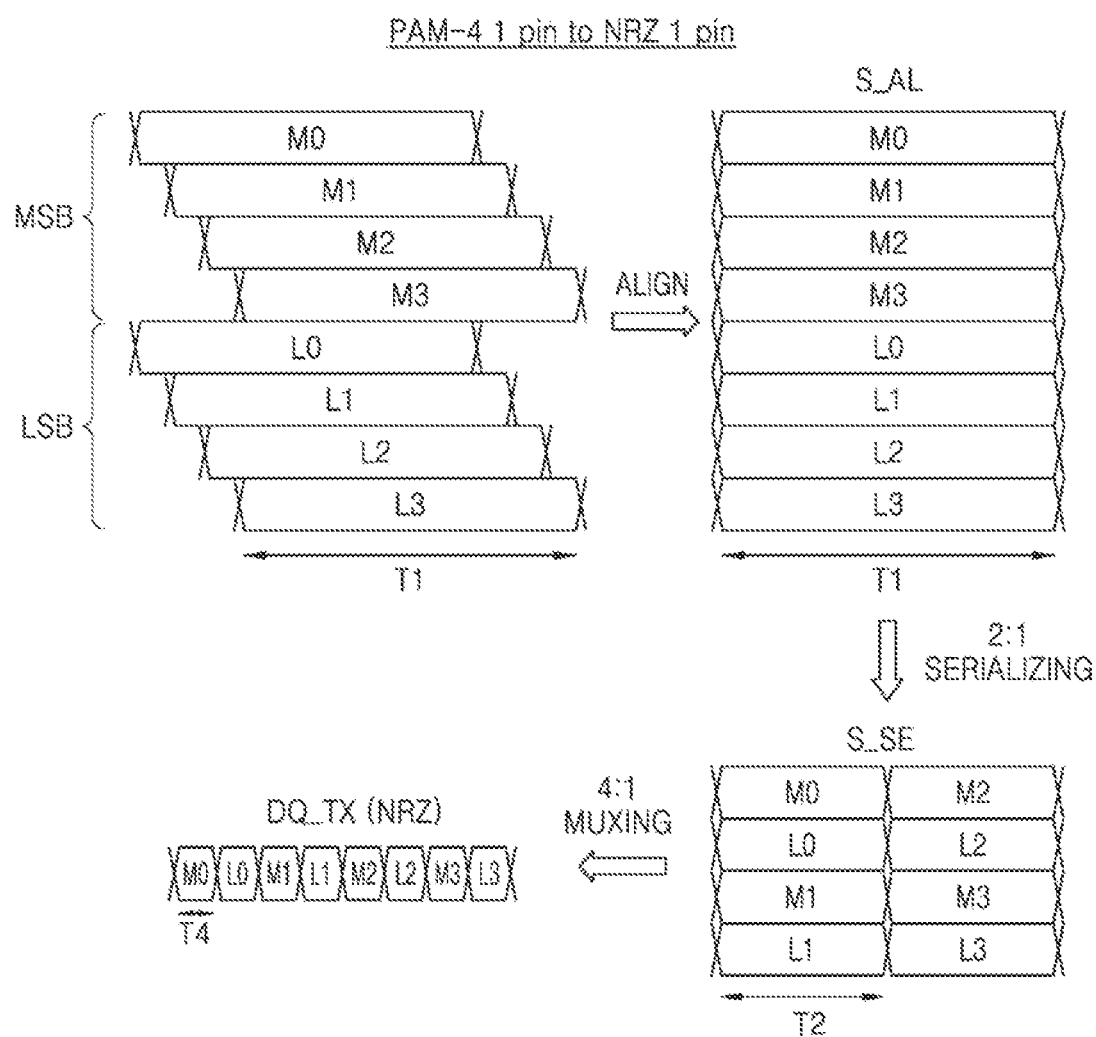
FIG. 23 exemplarily illustrates an operation of translating a data input signal of the PAM-4 mode into a data output signal of the NRZ mode, according to an embodiment.

FIG. 23 exemplarily illustrates an operation of translating a data input signal DQ_RX of the PAM-4 mode into a data output signal DQ_TX of the NRZ mode, according to an embodiment.

Referring to FIGS. 21 and 23, for example, a data transfer rate of a data input signal DQ_RX of the PAM-4 mode may correspond to about 5 Gbps. For example, a symbol duration or a symbol interval of the data input signal DQ_RX may be T3 (for example, 400 ps). The second I/O circuit 130 may perform a sense amplification operation DINSA on the data input signal DQ_RX on the basis of first internal clock signals iCK1[0] to iCK1[3], thereby generating most significant bits M0 to M3 and least significant bits L0 to L3. In this case, a frequency of each of the first internal clock signals iCK1[0] to iCK1[3] may be about 0.625 GHz and a toggling duration thereof may about 1.6 ns, and thus, a sampling period of the second I/O circuit 130 may be about 1.6 ns. Based on the sampling period of the second I/O circuit 130, each of most significant bits M0 to M3 and least significant bits L0 to L3 may maintain a signal level during T1 (for example, 1.6 ns).

The aligner 121 may align the most significant bits M0 to M3 and the least significant bits L0 to L3 on the basis of a first internal clock signal iCK1 to generate an aligned signal S_AL. In this case, the aligned signal S_AL may maintain a signal level during T1 (for example, 1.6 ns). The serializer 122a may perform 2:1 serializing on the aligned signal S_AL on the basis of a second internal clock signal iCK2 to generate a serialized signal S_SE. For example, a frequency of the second internal clock signal iCK2 may correspond to two times a frequency of the first internal clock signal iCK1. For example, a frequency of the second internal clock signal iCK2 may be about 1.25 GHz. In the selected signal S_SE, each bit may maintain a signal level during T2 (for example, 800 ps).

The multiplexer 123 may perform 4:1 multiplexing on the selected signal S_SE on the basis of a third internal clock signal iCK3 to generate a data output OUT. For example, a frequency of the third internal clock signal iCK3 may be higher than frequencies of the first and second internal clock signals iCK1 and iCK2. For example, a frequency of the third internal clock signal iCK3 may be about 2.5 GHz. The transmitter TX1 may generate the data output signal DQ_TX from the data output OUT. The data output signal DQ_TX may sequentially output a plurality of bits M0 to L3, and each bit may maintain a signal level during T4 (for example, 200 ps). As described above, a data transfer rate of the data output signal DQ_TX may be about 5 Gbps, and a data transfer rate of the data input signal DQ_RX may be maintained to be constant.

Figure 24:
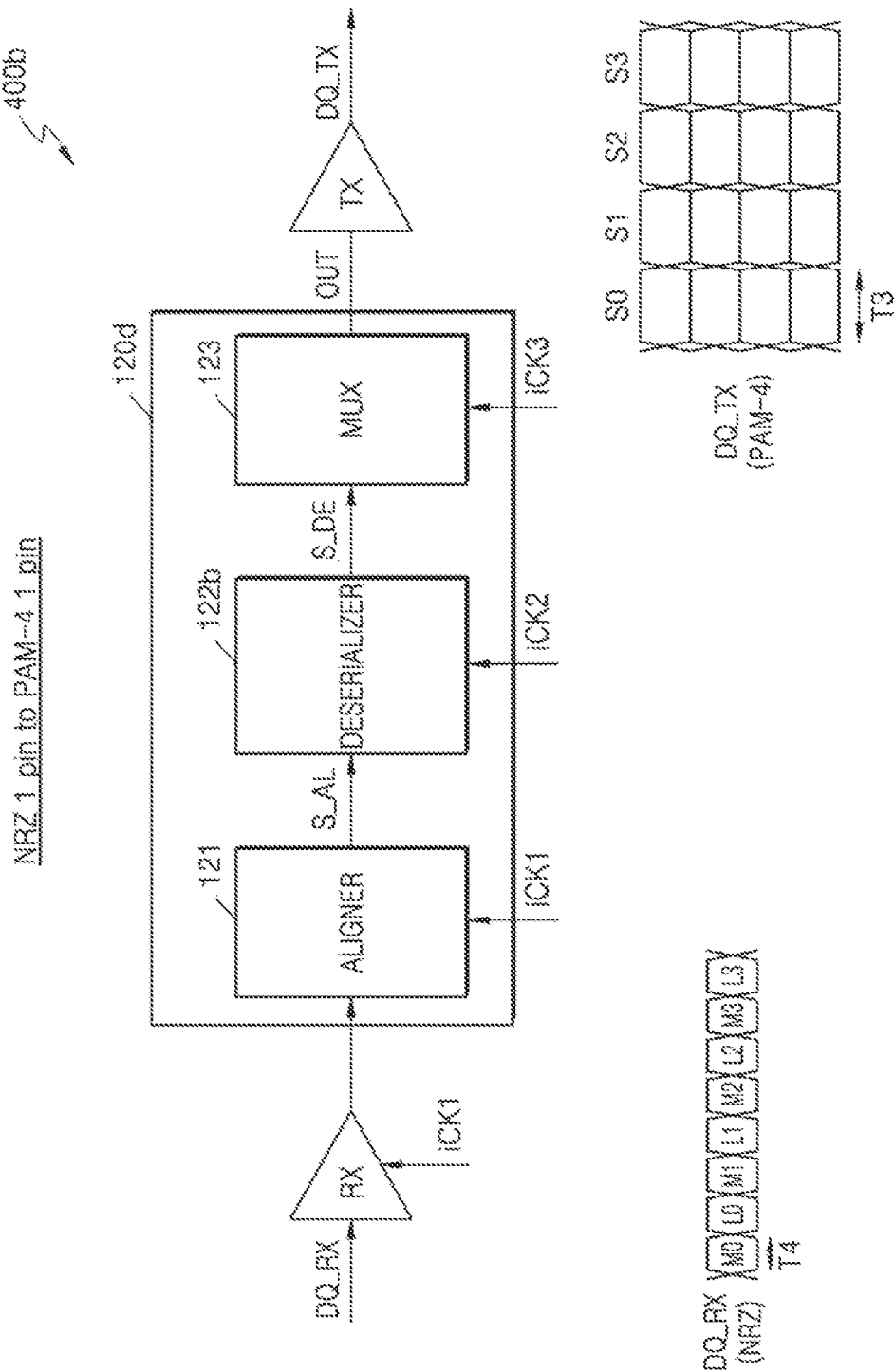
FIG. 24 is a block diagram illustrating in detail a BOT module according to an embodiment.

FIG. 24 is a block diagram illustrating in detail a BOT module 400b according to an embodiment.

Referring to FIG. 24, the BOT module 400b may include a receiver RX, a translation circuit 120d, and a transmitter TX. The receiver RX may receive a data input signal DQ_RX of the NRZ mode and may sample the data input signal DQ_RX on the basis of a first internal clock signal iCK1. For example, the data input signal DQ_RX may include a plurality of bits which are sequentially output, and a bit duration thereof may be T4 (for example, 200 ps).

The translation circuit 120d may include an aligner 121, a deserializer 122b, and a multiplexer (MUX) 123. The aligner 121 may generate an aligned signal S_AL from an output of the receiver RX on the first internal clock signal iCK1. The deserializer 122b may generate a deserialized signal S_DE from the aligned signal S_AL on the basis of a second internal clock signal iCK2. The multiplexer 123 may generate the data output OUT from the deserialized signal S_DE.

The transmitter TX may generate a data output signal DQ_TX from the data output OUT. The data output signal DQ_TX may include a plurality of symbols which are sequentially output, and a symbol duration thereof may be T3 (for example, 400 ps). Therefore, a data transfer rate of the data input signal DQ_RX may be the same as a data transfer rate of the data output signal DQ_TX.

Figure 25:
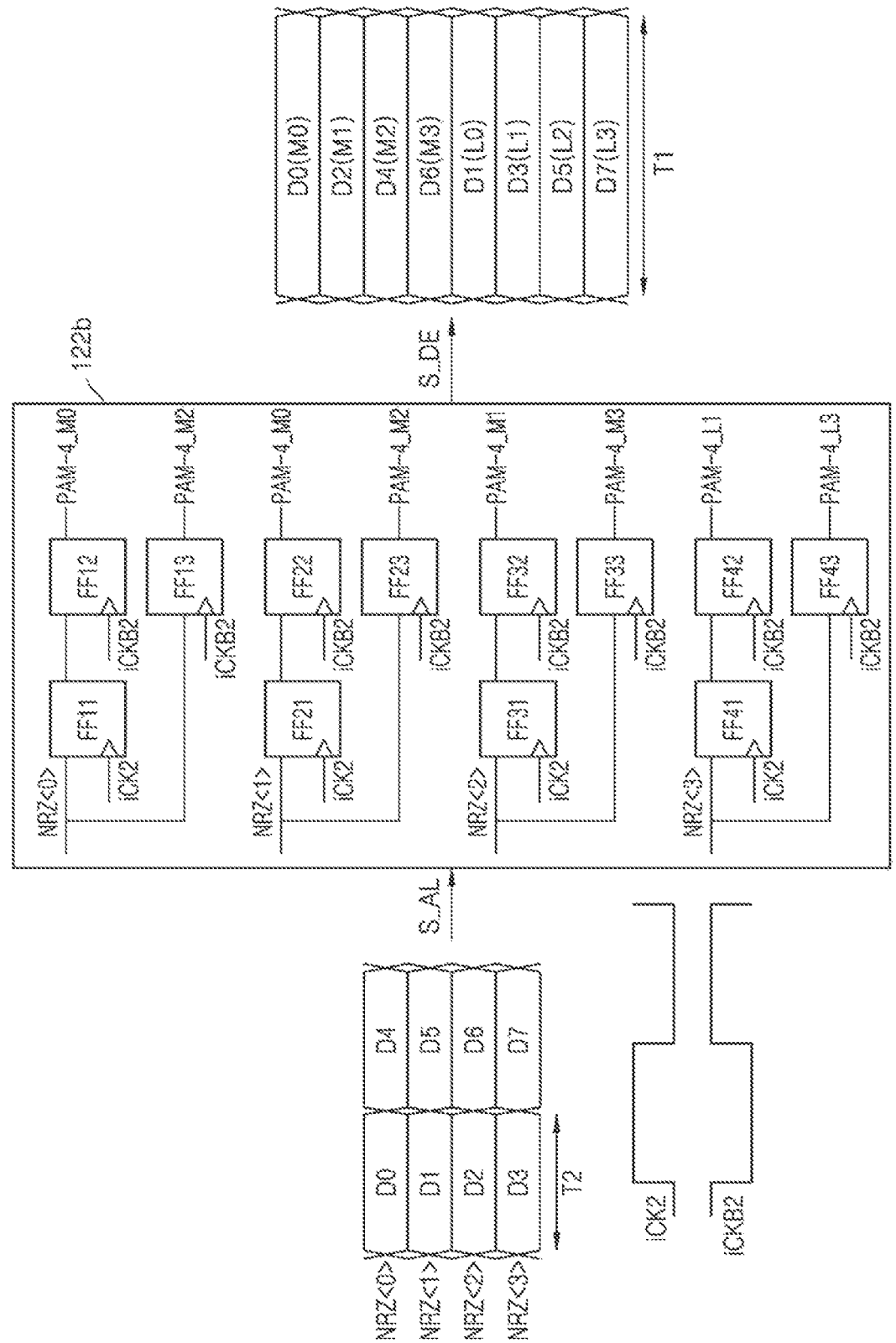
FIG. 25 is a block diagram illustrating a deserializer according to an embodiment.

FIG. 25 is a block diagram illustrating a deserializer 122b according to an embodiment.

Referring to FIG. 25, the deserializer 122b may include a plurality of flip-flops FF11 to FF43, and the plurality of flip-flops FF11 to FF43 may operate based on a second internal clock signal iCK2 and a second inverted internal clock signal iCKB2. The aligned signal S_AL may include an NRZ signal NRZ<3:0>. In this case, a bit duration of the aligned signal S_AL may be T2 (for example, 800 ps).

The flip-flop F11 may receive NRZ<0> on the basis of the second internal clock signal iCK2, and the flip-flop F12 may receive an output of the flip-flop F11 on the basis of the second inverted internal clock signal iCKB2 to generate PAM-4_M0. The flip-flop F13 may receive NRZ<0> on the basis of the second inverted internal clock signal iCKB2 to generate PAM-4_M2. Descriptions of the flip-flops F11 to F13 may be applied to the flip-flops F21 to F43. As described above, the deserializer 122b may perform 1:2 deserializing on the aligned signal S_AL to generate a deserialized signal S_DE. In this case, a bit duration or bit period of the deserialized signal S_DE may be T1 (for example, 1.6 ns).

Figure 26:
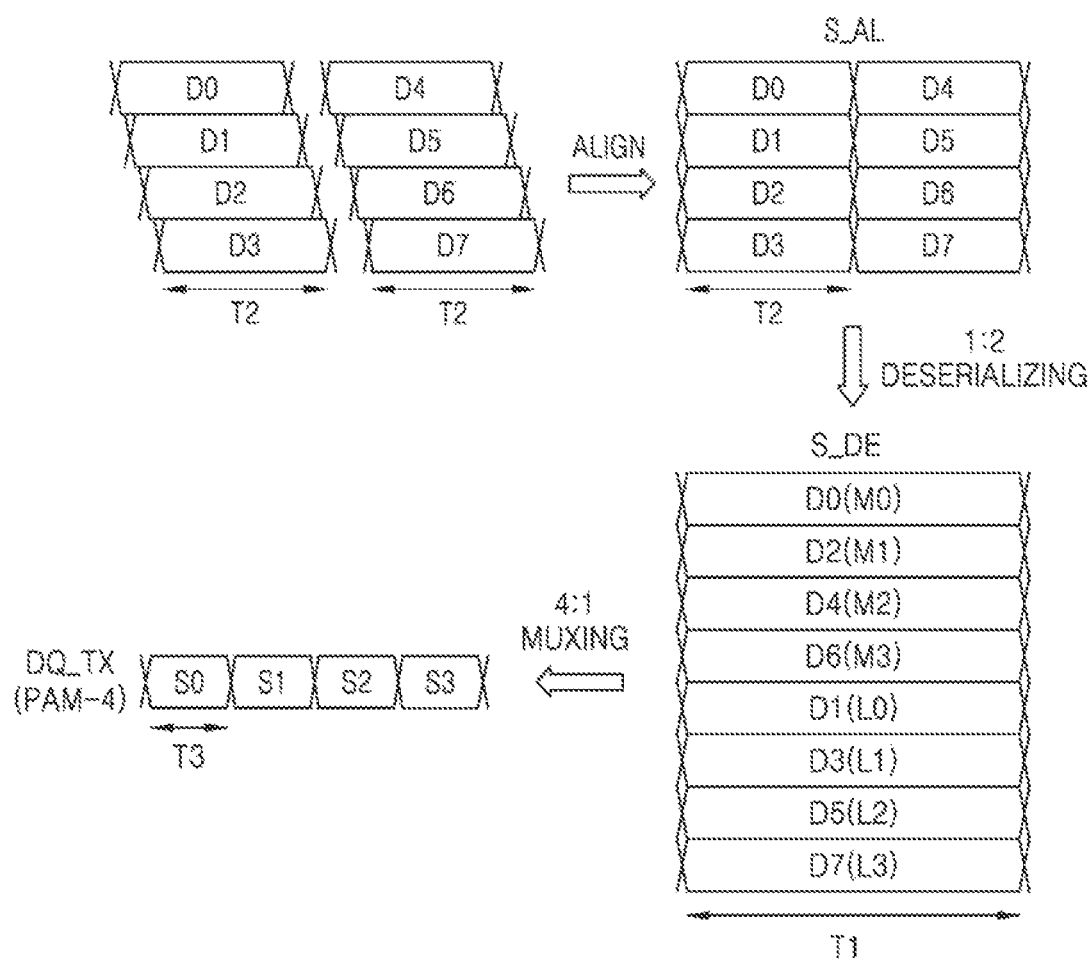
FIG. 26 exemplarily illustrates an operation of translating a data input signal of the NRZ mode into a data output signal of the PAM-4 mode, according to an embodiment.

FIG. 26 exemplarily illustrates an operation of translating a data input signal DQ_RX of the NRZ mode into a data output signal DQ_TX of the PAM-4 mode, according to an embodiment.

Referring to FIGS. 24 to 26, the data input signal DQ_RX of the NRZ mode may include a plurality of bits D0 to D7. For example, a bit interval in the data input signal DQ_RX may correspond to T2 (for example, 800 ps). The aligner 121 may align bits generated by the receiver RX on the basis of a first internal clock signal iCK1 to generate an aligned signal S_AL. The deserializer 122b may perform 1:2 deserializing on the aligned signal S_AL on the basis of a second internal clock signal iCK2 to generate a deserialized signal S_DE. A bit duration in the deserialized signal S_DE may be T1 (for example, 1.6 ns). The multiplexer 123 may perform 4:1 multiplexing on the deserialized signal S_DE on the basis of a third internal clock signal iCK3 to generate a data output OUT.

The transmitter TX may generate a data output signal DQ_TX from the data output OUT. A symbol duration in the data output signal DQ_TX may correspond to T3 (for example, 400 ps). A data transfer rate of the data input signal DQ_RX may be about 5 Gbps, and a data transfer rate of the data output signal DQ_TX may be about 5 Gbps. As described above, a data transfer rate of the data input signal DQ_RX may be the same as a data transfer rate of the data output signal DQ_TX.

Figure 27:
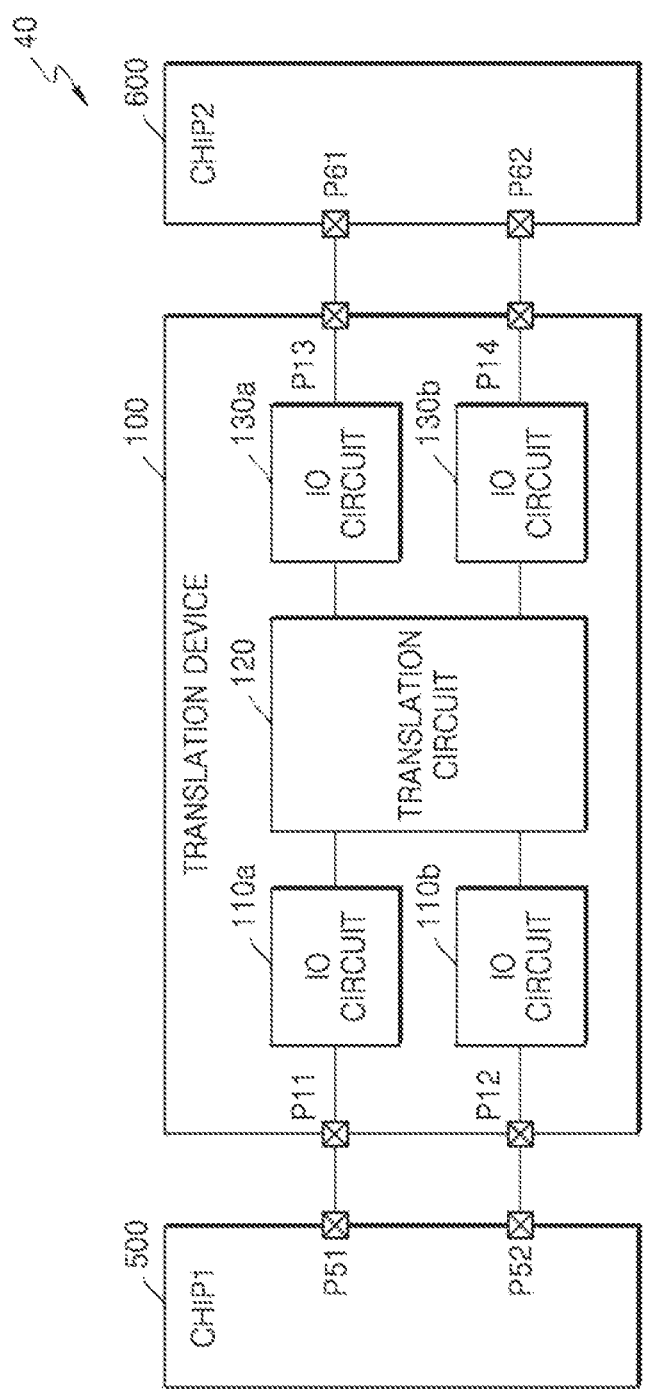
FIG. 27 is a block diagram illustrating a memory system according to an embodiment.

FIG. 27 is a block diagram illustrating a memory system 40 according to an embodiment.

Referring to FIG. 27, the memory system 40 may include a translation device 100, a first memory chip 500, and a second memory chip 600. The translation device 100 may include a plurality of first I/O circuits 110a and 110b, a translation circuit 120, and a plurality of second I/O circuits 130a and 130b, and details described above with reference to FIGS. 1 to 26 may be applied to the embodiment illustrated in FIG. 27. The first memory chip 500 may include a first I/O pin P51 and a second I/O pin P52, and the first and second I/O pins P51 and P52 may respectively correspond to the first and second pins P11 and P12 of the translation device 100. According to some embodiments, at least one of the first and second I/O pins P51 and P52 may be activated. The second memory chip 600 may include a first I/O pin P61 and a second I/O pin P62, and the first and second I/O pins P61 and P62 may respectively correspond to the third and fourth pins P13 and P14 of the translation device 100. According to some embodiments, at least one of the first and second I/O pins P61 and P62 may be activated.

Figure 28:
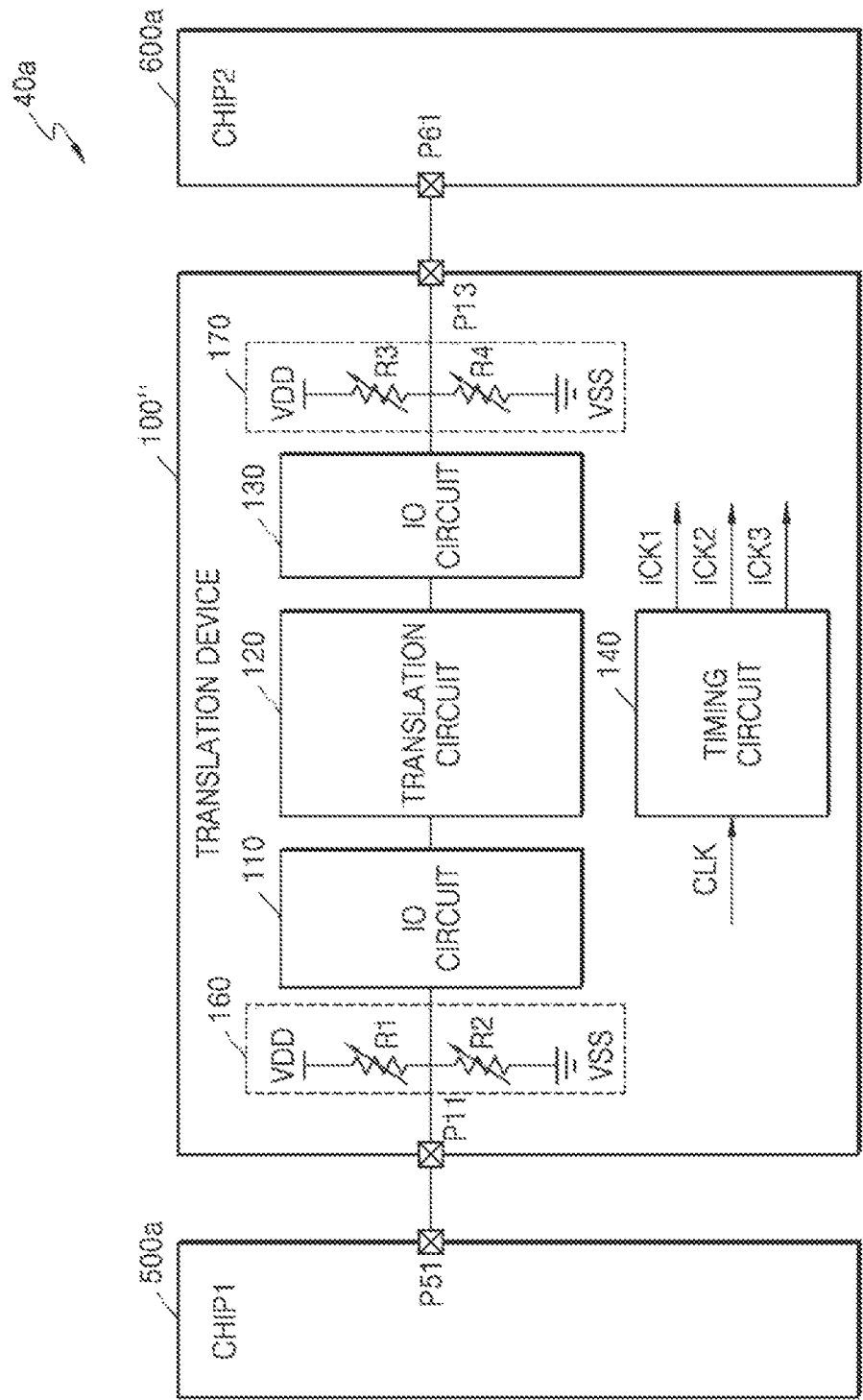
FIG. 28 is a block diagram illustrating a memory system according to an embodiment.

FIG. 28 is a block diagram illustrating a memory system 40a according to an embodiment.

Referring to FIG. 28, the memory system 40a may include a translation device 100", a first memory chip 500a, and a second memory chip 600a. The translation device 100" may include a first I/O circuit 110, a translation circuit 120, a second I/O circuit 130, a timing circuit 140, and a first termination circuit 160 and a second termination circuit 170, and details described above with reference to FIGS. 1 to 26 may be applied to the embodiment illustrated in FIG. 28. The first memory chip 500a may include a first I/O pin P51, and the first I/O pin P51 may be connected to the first pin P11 of the translation device 100". The second memory chip 600a may include a first I/O pin P61, and the first I/O pin P61 may be connected to the third pin P13 of the translation device 100".

Figure 29:
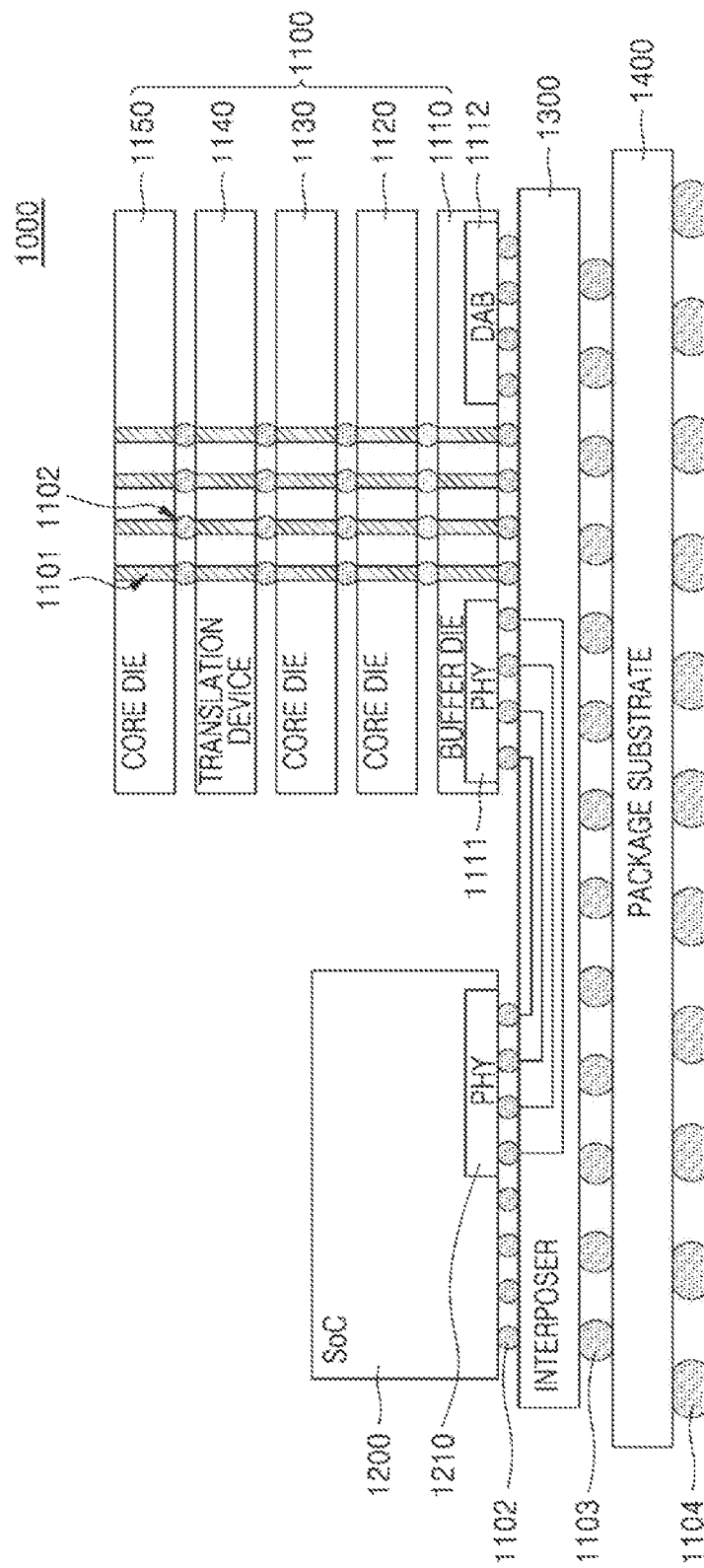
FIG. 29 illustrates a semiconductor package according to an embodiment.

FIG. 29 illustrates a semiconductor package 1000 according to an embodiment.

Referring to FIG. 29, the semiconductor package 1000 may include a stack type memory device 1100, a system on chip (SoC) 1200, an interposer 1300, and a package substrate 1400. The stack type memory device 1100 may include a buffer die 1110, a plurality of core dies 1120, 1130, and 1150, and a translation device 1140. The stack type memory device 1100 may correspond to the memory systems 40 and 40a described above with reference to FIGS. 26 and 27. For example, the core dies 1130 and 1150 may have different signal types, and the translation device 1140 may translate a signal type between the core dies 1130 and 1150. It is noted that FIG. 29 illustrates the translation device 1140 between the core die 1130 and the core die 1150. However, this is only an example, and in some embodiments, the translation device 1140 may be provided between other ones of the core dies depending on the signal types of the different core dies. For example, in some embodiments, the translation device 1140 may be provided between the core die 1130 and the core die 1120. Details described above with reference to FIGS. 1 to 28 may be applied to the embodiment illustrated in FIG. 29.

Each of the core dies 1120, 1130, and 1150 may include a plurality of memory cells for storing data. The buffer die 1110 may include a physical layer 1111 and a direct access region (DAB) 1112. The physical layer 1111 may be electrically connected to the physical layer 1210 of the SoC 1200 through the interposer 1300. The stack type memory device 1100 may receive signals from the SoC 1200 through the physical layer 1111, or may transmit the signals to the SoC 1200.

The direct access region 1112 may provide an access path which enables the stack type memory device 1100 to be tested without passing through the SoC 1200. The direct access region 1112 may include a conductive connector (for example, a port or a pin) which may directly communicate with an external test device. A test signal received through the direct access region 1112 may be transmitted to the core dies 1120, 1130, and 1150 and the translation device 1140 through a plurality of through silicon vias (TSVs) 1101. Data read from the core dies 1120, 1130, and 1150 may be transmitted to the translation device 1140, the TSVs 1101, and the direct access region 1112, in order to test the core dies 1120, 1130, and 1150. Therefore, a direct access test may be performed on the core dies 1120, 1130, and 1150.

The buffer die 1110, the core dies 1120, 1130, and 1150, and the translation device 1140 may be electrically connected to one another through the TSVs 1101 and a plurality of bumps 1102. The buffer die 1110 may receive signals, provided to each channel through the bumps 1102 allocated for each channel, from the SoC 1200, or may transmit signals to the SoC 1200 through the bumps 1102. For example, the bumps 1102 may be micro-bumps.

The SoC 1200 may execute applications supported by the semiconductor package 1000 by using the stack type memory device 1100. For example, the SoC 1200 may include at least one of a central processing unit (CPU), an application processor (AP), a graphic processing unit (GPU), a neural processing unit (NPU), a tensor processing unit (TPU), a vision processing unit (VPU), an image signal processor (ISP), a digital signal processor (DSP) and may execute certain arithmetic operations.

The SoC 1200 may control an overall operation of the stack type memory device 1100. The SoC 1200 may include the physical layer 1210. The physical layer 1210 may include an interface circuit for transmitting or receiving signals to or from the physical layer 1111 of the stack type memory device 1100. The SoC 1200 may provide various signals to the physical layer 1111 through the physical layer 1210. Signals provided to the physical layer 1111 may be transferred to the core dies 1120, 1130, and 1150 and the translation device 1140 through the interface circuit of the physical layer 1111 and the TSVs 1101.

The interposer 1300 may connect the stack type memory device 1100 to the SoC 1200. The interposer 1300 may connect the physical layer 1111 of the stack type memory device 1100 to the physical layer 1210 of the SoC 1200 and may provide physical paths formed of conductive materials. Therefore, the stack type memory device 1100 and the SoC 1200 may be stacked on the interposer 1300 and may transmit and receive signals therebetween.

The bumps 1103 may be attached on an upper portion of the package substrate 1400, and a solder ball 1104 may be attached on a lower portion of the package substrate 1400. For example, the bumps 1103 may be flip-chip bumps. The interposer 1300 may be stacked on the package substrate 1400 through the bumps 1103. The semiconductor package 1000 may transmit or receive signals to or from an external package or semiconductor devices through the solder ball 1104. For example, the package substrate 1400 may be a printed circuit board (PCB).

Figure 30:
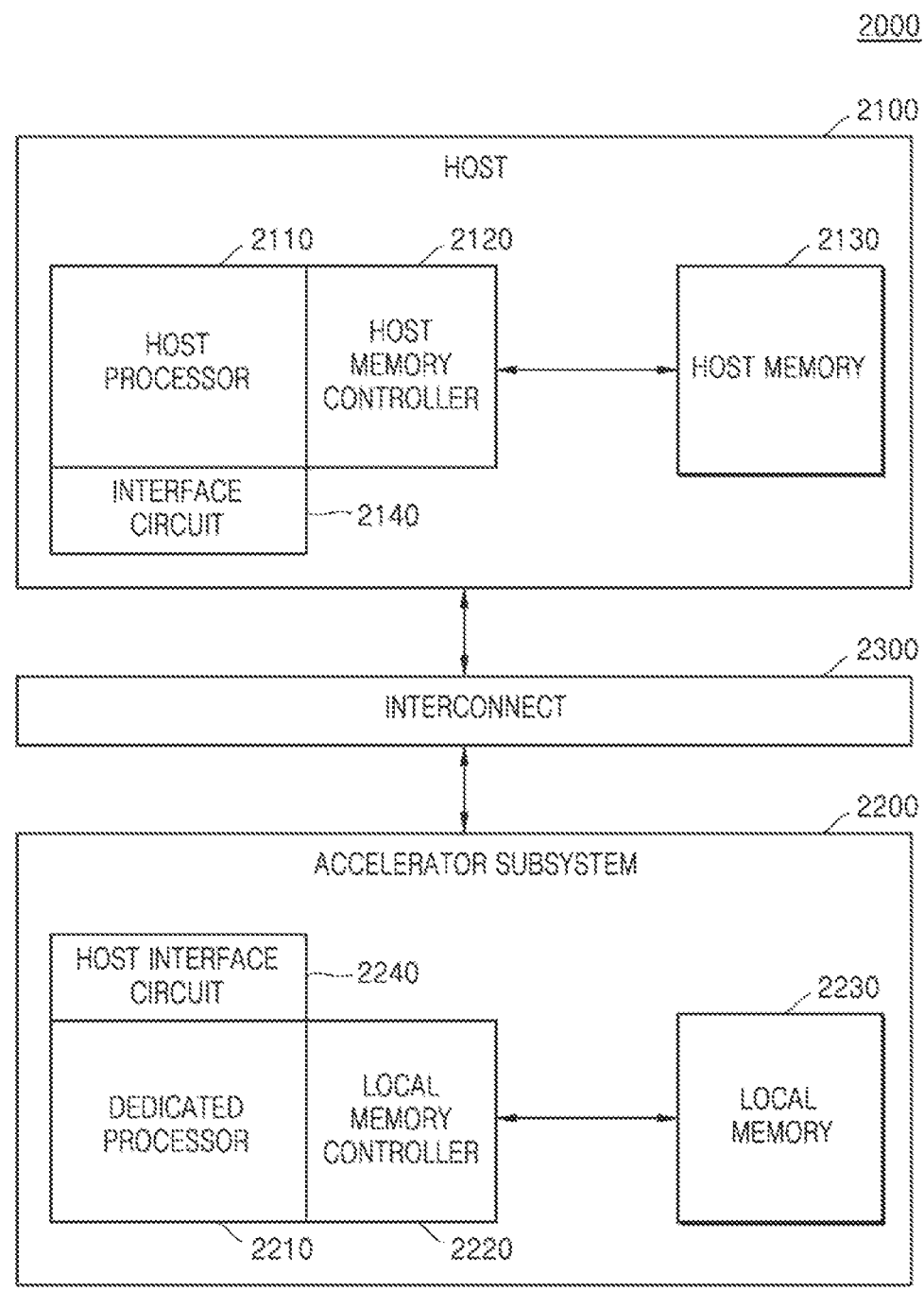
FIG. 30 is a block diagram illustrating a computing system according to an embodiment.

FIG. 30 is a block diagram illustrating a computing system 2000 according to an embodiment. The computing system 2000 may be implemented with one electronic device, or may be distributed to or implemented on two or more electronic devices. For example, the computing system 2000 may be implemented with at least one of various electronic devices such as a desktop computer, a laptop computer, a tablet computer, a smartphone, a self-driving vehicle, a digital camera, a wearable device, a healthcare device, a server system, a data center, a drone, a handheld game console, an Internet of things (IoT) device, a graphics accelerator, and an artificial intelligence (AI) accelerator.

Referring to FIG. 30, the computing system 2000 may include a host 2100, an accelerator subsystem 2200, and an interconnect 2300. The host 2100 may control an overall operation of the accelerator subsystem 2200, and the accelerator subsystem 2200 may operate based on control by the host 2100. The host 2100 may be connected to the accelerator subsystem 2200 through the interconnect 2300. Various signals and data may be transmitted and received between the host 2100 and the accelerator subsystem 2200 through the interconnect 2300.

The host 2100 may include a host processor 2110, a host memory controller 2120, a host memory 2130, and an interface circuit 2140. The host processor 2110 may control an overall operation of the computing system 2000. The host processor 2110 may control the host memory 2130 through the host memory controller 2120. The host processor 2110 may control the accelerator subsystem 2200 connected thereto through the interconnect 2300. For example, the host processor 2110 may transmit an instruction to the accelerator subsystem 2200 to allocate an operation to the accelerator subsystem 2200.

The host processor 2110 may be a general-use processor or a main processor, which performs general arithmetic operations associated with various operations. For example, the host processor 2110 may be a central processing unit (CPU) or an application processor (AP).

The host memory 2130 may be a main memory of the computing system 2000. The host memory 2130 may store data obtained through processing by the host processor 2110, or may store data received from the accelerator subsystem 2200. For example, the host memory 2130 may be implemented as dynamic random access memory (DRAM). However, embodiments are not limited thereto, and the host memory 2130 may include at least one of a volatile memory such as static random access memory (SRAM) and a non-volatile memory such as flash memory, phase change random access memory (PRAM), resistance random access memory (RRAM), and magnetic random access memory (MRAM).

The interface circuit 2140 may be configured to enable the host 2100 to perform communication with the accelerator subsystem 2200. The host processor 2110 may transmit control signals and data to the accelerator subsystem 2200 through the interface circuit 2140 and may receive signals and data from the accelerator subsystem 2200. In some embodiments, the host processor 2110, the host memory controller 2120, and the interface circuit 2140 may be implemented as one chip.

The accelerator subsystem 2200 may perform a certain function on the basis of control by the host 2100. For example, the accelerator subsystem 2200 may perform arithmetic operations suitable for a certain application on the basis of control by the host 2100. The accelerator subsystem 2200 may be physically or electrically connected to the host 2100, or may be implemented as various types such as a module, a card, a package, a chip, and a device so as to be connected thereto wirelessly or by wire. For example, the accelerator subsystem 2200 may be implemented as a graphics card or an accelerator card. For example, the accelerator subsystem 2200 may be implemented based on field programmable gate array (FPGA) or application specific integrated circuit (ASIC).

In some embodiments, the accelerator subsystem 2200 may be implemented based on one of various packaging techniques. For example, the accelerator subsystem 2200 may be implemented with a packaging technique such as ball grid arrays (BGAs), multi chip package (MCP), system on package (SOP), system in package (SIP), package on package (POP), chip scale packages (CSPs), wafer level package(WLP), or panel level package (PLP). In some embodiments, some or all elements of the accelerator subsystem 2200 may be connected to one another through copper-to-copper boding. In some embodiments, some or all elements of the accelerator subsystem 2200 may be connected to one another through an interposer such as a silicon interposer, an organic interposer, a glass interposer, or an active interposer. In some embodiments, some or all elements of the accelerator subsystem 2200 may be stacked based on a TSV. In some embodiments, some or all elements of the accelerator subsystem 2200 may be connected to one another through a high speed connection path (for example, a silicon bridge).

The accelerator subsystem 2200 may include a dedicated processor 2210, a local memory controller 2220, a local memory 2230, and a host interface circuit 2240. The dedicated processor 2210 may operate based on control by the host processor 2110. For example, the dedicated processor 2210 may read data from the local memory 2230 through the local memory controller 2220 in response to an instruction of the host processor 2110. The dedicated processor 2210 may perform an arithmetic operation on the basis of the read data to process data. The dedicated processor 2210 may transfer the processed data to the host processor 2110, or may write the processed data in the local memory 2230.

The dedicated processor 2210 may perform arithmetic operations suitable for a certain application on the basis of a value stored in the local memory 2230. For example, the dedicated processor 2210 may perform arithmetic operations suitable for applications such as artificial intelligence (AI) (e.g., the dedicated processor 2210 may be an AI engine), streaming analysis, video transcoding, data indexing, data encoding/decoding, and data encryption. Therefore, the dedicated processor 2210 may process various types of data such as image data, voice data, motion data, biodata, and a key value. For example, the dedicated processor 2210 may include at least one of a GPU, an NPU, a TPU, a VPU, an ISP, and a DSP.

The dedicated processor 2210 may include one processor core, or may include a plurality of processor cores such as a dual core, a quad core, and a hexa core. In some embodiments, the dedicated processor 2210 may include more cores than the host processor 2110, for example in a configuration involving an arithmetic operation suitable for parallel processing. For example, the dedicated processor 2210 may include 1,000 or more cores.

The local memory controller 2220 may control an overall operation of the local memory 2230. In some embodiments, the local memory controller 2220 may perform error correction code (ECC) encoding and ECC decoding, perform data verification on the basis of cyclic redundancy check (CRC), or perform data encryption and data decryption.

The local memory 2230 may be used as a dedicated memory by the dedicated processor 2210. The local memory 2230 may be implemented as DRAM, but embodiments are not limited thereto. For example, the local memory 2230 may include at least one of a volatile memory such as SRAM and a non-volatile memory such as flash memory, PRAM, RRAM, and MRAM. In some embodiments, the local memory 2230 may be mounted on one substrate along with the dedicated processor 2210, or may be implemented as various types such as a die, a chip, a package, a module, a card, and a device so as to be connected to the dedicated processor 2210 on the basis of a separate connector. The local memory 2230 may correspond to the memory systems 40 and 40a or the stack type memory device 1100 described above with reference to FIGS. 27 to 29.

In some embodiments, the local memory 2230 may include a logic circuit for performing some arithmetic operations. The logic circuit may perform a linear operation, a comparison operation, a compression operation, a data translation operation, and an arithmetic operation on data read from the local memory 2230 or data which is to be written in the local memory 2230. Therefore, a size of data obtained through processing by the logic circuit may be reduced. When a data size is reduced, bandwidth efficiency between the local memory 2230 and the local memory controller 2220 may be enhanced.

The host interface circuit 2240 may be configured to enable the accelerator subsystem 2200 to perform communication with the host 2100. The accelerator subsystem 220 may transmit a signal and data to the host 2100 through the host interface circuit 2240 and may receive a control signal and data from the host 2100. In some embodiments, the dedicated processor 2210, the local memory controller 2220, and the host interface circuit 2240 may be implemented as one chip.

The interconnect 2300 may provide a data transfer path between the host 2100 and the accelerator subsystem 2200 and may act as a data bus or a data link. The data transfer path may be formed by wire or wirelessly. The interface circuit 2140 and the host interface circuit 2240 may communicate with each other through the interconnect 2300 on the basis of a predetermined protocol. For example, the interface circuits 2140 and 2240 may perform communication on the basis of various standards such as advanced technology attachment (ATA), serial ATA (SATA), external SATA (e-SATA), small computer small interface (SCSI), serial attached SCSI (SAS), peripheral component interconnection (PCI), PCI express (PCIe), NVM express (NVMe), advanced eXtensible interface (AXI), ARM microcontroller bus architecture (AMBA), IEEE 1394, universal serial bus (USB), secure digital (SD) card, multi-media card (MMC), embedded multi-media card (eMMC), universal flash storage (UFS), compact flash (CF), and Gen-Z. Alternatively, the interface circuits 2140 and 2240 may perform communication on the basis of a communication link between devices such as open coherent accelerator processor interface (CAPI), cache coherent interconnect for accelerators (CCIX), compute express link (CXL), and NVLINK. Alternatively, the interface circuits 2140 and 2240 may perform communication on the basis of wireless communication technology such as long term evolution (LTE), 5$^{th}$ generation (5G), LTE machine (LTE-M), narrowband Internet of things (NB-IoT), low power wide area network (LPWAN), Bluetooth, near field communication (NFC), Zigbee, Z-Wave, or wireless local area network (WLAN).

In some embodiments, the accelerator subsystem 2200 may further include a sensor for sensing image data, voice data, motion data, biodata, and peripheral environment information. In some embodiments, when a sensor is included in the accelerator subsystem 2200, the sensor may be connected to other elements (for example, the dedicated processor 2210 and the local memory 2230) on the basis of the packaging technique described above. The accelerator subsystem 2200 may process data sensed by the sensor on the basis of certain arithmetic operations.

In FIG. 30, it is illustrated that the dedicated processor 2210 uses one local memory 2230 through one local memory controller 2220, but embodiments are not limited thereto. For example, the dedicated processor 2210 may use a plurality of local memories through one local memory controller 2220. As another example, the dedicated processor 2210 may use a local memory corresponding to the dedicated processor 2210 through each of a plurality of local memory controllers.

While various embodiments have been particularly shown and described above, it will be understood that various changes in form and details may be made therein without departing from the spirit and scope of the following claims.

What is claimed is:

1. A test system comprising:
an automatic test equipment (ATE) including a first pin and a second pin;
a device under test (DUT) including a third pin; and
a built out test (BOT) module configured to be connected to the ATE and the DUT, wherein the BOT module comprises:
a plurality of first input/output (I/O) circuits connected to the first pin and the second pin, respectively, and configured to transmit and receive first signals based on a pulse amplitude modulation (PAM)-M mode;
a second I/O circuit connected to the third pin and configured to transmit and receive a second signal based on a PAM-N mode; and
a translation circuit configured to translate the first signals into the second signal and configured to translate the second signal into the first signals, and
M and N are different integers of 2 or more,
wherein the first signals are received by the first pin and the second pin, translated into the second signal by the translation circuit, and transmitted through the third pin, and
the second signal is received by the third pin, translated into the first signals by the translation circuit, and transmitted through the first pin and the second pin.

2. The test system of claim 1, wherein the BOT module further comprises a plurality of first termination circuits respectively connected to the plurality of first I/O circuits and configured to each provide a first termination resistance; and
a second termination circuit connected to the second I/O circuit and configured to provide a second termination resistance.

3. The test system of claim 2, wherein each of the plurality of first termination circuits comprises at least one variable resistor to vary the first termination resistance, and
the second termination circuit comprises at least one variable resistor to vary the second termination resistance.

4. The test system of claim 1, wherein the BOT module further comprises:

a plurality of first termination circuits respectively connected to the plurality of first I/O circuits and configured to each provide a first termination resistance; and a second termination circuit connected to the second I/O circuit and configured to provide a second termination resistance.

5. The test system of claim 4, wherein a termination type of each of the plurality of first termination circuits includes a center tapped termination (CTT) type, a pseudo open drain (POD) type, or a low voltage swing termination logic (LVSTL) type, and a termination type of the second termination circuit includes the CTT type, the POD type, or the LVSTL type.

6. The test system of claim 4, wherein each of the plurality of first termination circuits comprises at least one variable resistor to vary the first termination resistance, and the second termination circuit comprises at least one variable resistor to vary the second termination resistance.

7. The test system of claim 1, wherein M is 2, and each of the first signals is a non-return to zero (NRZ) signal modulated based on an NRZ mode, and N is 4, and the second signal is a PAM-4 signal modulated based on a PAM-4 mode.

8. The test system of claim 7, wherein the plurality of first I/O circuits are configured to receive the first signals including a first NRZ signal and a second NRZ signal, the translation circuit is configured to translate the first NRZ signal and the second NRZ signal into the PAM-4 signal, and the second I/O circuit is configured to transmit the PAM-4 signal.

9. The test system of claim 8, wherein the plurality of first I/O circuits are configured to sample each of the first NRZ signal and the second NRZ signal based on a first internal clock signal having a first frequency to generate a most significant bit and a least significant bit, and the translation circuit comprises:

an aligner configured to generate an aligned signal from the most significant bit and the least significant bit based on the first internal clock signal;

a data selector configured to generate a selected signal from the aligned signal based on a second internal clock signal having a second frequency; and a multiplexer configured to multiplex the selected signal based on a third internal clock signal having a third frequency which is higher than each of the first frequency and the second frequency.

10. The test system of claim 7, wherein the second I/O circuit is configured to receive the second signal including the PAM-4 signal, the translation circuit is configured to translate the PAM-4 signal into a first non-return to zero (NRZ) signal and a second NRZ signal, and the plurality of first I/O circuits are configured to transmit the first NRZ signal and the second NRZ signal.

11. The test system of claim 1, wherein M is 4, and each of the first signals is a PAM-4 signal modulated based on a PAM-4 mode, and N is 2, and the second signal is a non-return to zero (NRZ) signal modulated based on an NRZ mode.

12. The test system of claim 11, wherein the plurality of first I/O circuits are configured to receive the first signals including a first PAM-4 signal and a second PAM-4 signal, the translation circuit is configured to translate the first PAM-4 signal and the second PAM-4 signal into the NRZ signal, and the second I/O circuit is configured to transmit the NRZ signal.

13. A memory system comprising:

a first memory chip including a first pin and a second pin;

a second memory chip including a third pin; and a translation device configured to be connected between the first memory chip and the second memory chip, wherein the translation device comprises:

a plurality of first input/output (I/O) circuits connected to the first pin and the second pin and configured to transmit and receive first signals based on a pulse amplitude modulation (PAM)-M mode;

a second I/O circuit connected to the third pin and configured to transmit and receive a second signal based on a PAM-N mode; and a translation circuit configured to translate the first signals into the second signal and configured to translate the second signal into the first signals, and M and N are different integers of 2 or more, wherein the first signals are received by the first pin and the second pin, translated into the second signal by the translation circuit, and transmitted through the third pin, and the second signal is received by the third pin, translated into the first signals by the translation circuit, and transmitted through the first pin and the second pin.

14. The memory system of claim 13, wherein a plurality of first termination circuits respectively connected to the plurality of first I/O circuits and configured to each provide a first termination resistance; and a second termination circuit connected to the second I/O circuit and configured to provide a second termination resistance.

15. The memory system of claim 14, wherein each of the plurality of first termination circuits comprises at least one variable resistor to vary the first termination resistance, and the second termination circuit comprises at least one variable resistor to vary the second termination resistance.

16. A translation device comprising:

a first input/output (I/O) circuit configured to transmit and receive a first signal based on a non-return to zero (NRZ) mode;

a second I/O circuit configured to transmit and receive a second signal based on a pulse amplitude modulation (PAM)-4 mode;

a translation circuit configured to translate the first signal into the second signal and to translate the second signal into the first signal;

a first termination circuit disposed between a first I/O pin and the first I/O circuit and configured to provide a first termination resistance; and a second termination circuit disposed between a second 1/O pin and the second I/O circuit and configured to provide a second termination resistance, wherein the first signal is received by the first I/O pin, translated into the second signal by the translation circuit and transmitted through the second I/O pin, and the second signal is received by the second I/O pin, translated into the first signal by the translation circuit, and transmitted through the first I/O pin, wherein the first signal is an NRZ signal modulated based on the NRZ mode, and the second signal is a PAM-4 signal modulated based on the PAM-4 mode, and wherein the translation circuit comprises:

an aligner configured to align sampled most significant bits and least significant bits in the PAM-4 signal based on a first internal clock signal having a first frequency to generate an aligned signal;

a serializer configured to serialize the aligned signal based on a second internal clock signal having a second frequency to generate a selected signal; and a multiplexer configured to multiplex the selected signal based on a third internal clock signal having a third frequency.

17. The translation device of claim 16, wherein a termination type of the first termination circuit includes a center tapped termination (CTT) type, a pseudo open drain (POD) type, or a low voltage swing termination logic (LVSTL) type, and a termination type of the second termination circuit includes the CTT type, the POD type, or the LVSTL type.

18. The translation device of claim 16, wherein the first termination circuit comprises at least one variable resistor to vary the first termination resistance, and the second termination circuit comprises at least one variable resistor to vary the second termination resistance.

* * * * *